(12) United States Patent
Hasuo et al.

(10) Patent No.: US 6,594,650 B2
(45) Date of Patent: *Jul. 15, 2003

(54) FILE MANAGEMENT SYSTEM AND ITS METHOD AND STORAGE MEDIUM

(75) Inventors: Kamon Hasuo, Kawasaki (JP); Masashi Yahara, Yokohama (JP); Ryuichi Masuda, Tokyo (JP); Tsutomu Murayama, Yokohama (JP); Satoru Nakajima, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/384,427

(22) Filed: Aug. 27, 1999

(65) Prior Publication Data

US 2003/0105776 A1 Jun. 5, 2003

(30) Foreign Application Priority Data

Sep. 4, 1998 (JP) .......................................... 10-267350
Sep. 4, 1998 (JP) .......................................... 10-267351

(51) Int. Cl.[7] .............................................. G06F 17/30
(52) U.S. Cl. ........................ 707/2; 707/104.1; 382/306
(58) Field of Search ........................ 707/1–5; 358/403; 382/305–306

(56) References Cited

U.S. PATENT DOCUMENTS

| 5,243,439 | A | * | 9/1993 | Jacobus et al. ............. 358/448 |
|---|---|---|---|---|
| 5,363,504 | A | * | 11/1994 | Hasuo ....................... 707/104.1 |
| 5,430,276 | A | * | 7/1995 | Ohtani et al. ................. 235/375 |
| 5,477,331 | A | * | 12/1995 | Yamaguchi et al. ......... 358/296 |
| 5,742,808 | A | * | 4/1998 | Hasuo ............................ 707/1 |
| 5,881,214 | A | * | 3/1999 | Moriasawa et al. ......... 358/1.18 |
| 6,128,102 | A | * | 10/2000 | Ota .............................. 358/403 |
| 6,154,755 | A | * | 11/2000 | Dellert et al. ................ 707/526 |
| 6,154,779 | A | * | 11/2000 | Otani et al. .................. 709/232 |
| 6,192,165 | B1 | * | 2/2001 | Irons ........................... 382/306 |
| 6,269,379 | B1 | * | 7/2001 | Hiyama et al. .............. 707/104 |
| 6,304,335 | B1 | * | 10/2001 | Furuya et al. .............. 358/1.15 |
| 6,427,032 | B1 | * | 7/2002 | Irons et al. .................. 382/306 |
| 2002/0075514 | A1 | * | 6/2002 | Wright et al. ............... 358/1.15 |
| 2002/0111960 | A1 | * | 8/2002 | Irons et al. .................. 707/204 |
| 2002/0150311 | A1 | * | 10/2002 | Lynn ........................... 382/306 |

* cited by examiner

Primary Examiner—Jean R. Homere
Assistant Examiner—Luke S Wassum
(74) Attorney, Agent, or Firm—Fitzpatrick, Cella, Harper & Scinto

(57) ABSTRACT

A document management system having enhanced operability so that a plurality of documents can be processed at a time by integrating a search operation, an image recording operation, and an index input operation. In the document management system of the present invention, input search conditions are transmitted to a search portion, which finds out a document satisfying the search conditions from a document data base via an index data recording management portion and outputs the result to a document list control portion. The document list control portion prepares a document list from the result and displays it in a document list display portion. For a new record processing, image data on a manuscript read by a scanner is output to an image control portion. The image control portion records the image data into an image recording portion and reports new document creating information to the document list control portion. The document list control portion creates a new record on the basis of the new document creating information and adds it to an already displayed document list for a display.

45 Claims, 26 Drawing Sheets

| | PROPERTIES | NO. | TITLE | CHAPTER | PAGES | RANK | ENTRY DATE |
|---|---|---|---|---|---|---|---|
| | | | 51 | 52 | 53 | 54 | 55 | 56 | 57 |
| 58 | ○ · · · · | 1 | menu spec | 1-1 | 23 | A | 98/06/24 |
| | ○ · · · · | 2 | menu spec | 1-2 | 35 | B | 98/06/24 |
| 60 | ○ · · · · | 3 | menu spec | 1-3 | 12 | D | 98/06/24 |
| | ○ · · · · | 4 | X-1 report | 1 | 50 | A | 98/06/24 |
| | ○ · · · · | 5 | X-2 report | 1 | 45 | | 98/06/24 |
| | ○ · · · · | 6 | | | 44 | | 98/06/24 |
| | ○ · · · · | 7 | | | 16 | | 98/06/24 |
| 61 | ○ · · · · | 8 | | | 8 | | 98/06/24 |
| | ○ · · · · | 9 | | | 9 | | 98/06/24 |
| | 59 ○ · · · · | 10 | | | 12 | | 98/06/24 |
| | △ · · · · | 11 | menu spec | 2-1 | 0 | | |
| 62 | △ · · · · | 12 | menu spec | 2-2 | 0 | | |
| | △ · · · · | 13 | menu spec | 3-1 | 0 | | |
| | △ · · · · | 14 | installer spec | | 0 | | |
| | △ · · · · | 15 | function spec | | 0 | | |
| | □ · · · · | * | | | | | |

FIG. 4

| PROPERTIES | NO. | TITLE | CHAPTER | PAGES | RANK | ENTRY DATE |
|---|---|---|---|---|---|---|
| ○ · · · | 1 | menu spec | 1-1 | 23 | A | 98/06/24 |
| ○ · · · | 2 | menu spec | 1-2 | 35 | B | 98/06/24 |
| ○ · · · | 3 | menu spec | 1-3 | 12 | D | 98/06/24 |
| ○ · · · | 4 | X-1 report | 1 | 50 | A | 98/06/24 |
| ○ · · · | 5 | X-2 report | 1 | 45 | | 98/06/24 |
| ○ · · · | 6 | | | 44 | | 98/06/24 |
| ○ · · · | 7 | | | 16 | | 98/06/24 |
| ○ · · · | 8 | | | 8 | | 98/06/24 |
| ○ · · · | 9 | | | 9 | | 98/06/24 |
| ○ · · · | 10 | | | 12 | | 98/06/24 |
| △ · · · | 11 | menu spec | 2-1 | 0 | | |
| △ · · · | 12 | menu spec | 2-2 | 0 | | |
| △ · · · | 13 | menu spec | 3-1 | 0 | | |
| △ · · · | 14 | installer spec | | 0 | | |
| ▲ · · · | 15 | function spec | | 0 | | |
| □ · · · | * | | | | | |

FIG. 5A

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | menu spec | 1-2 | 35 | B | 98/06/26 |
| ○ · · · · | 3 | menu spec | 1-3 | 12 | D | 98/06/26 |
| ○ · · · · | 4 | function spec | 10 | 3 | C | 98/06/26 |
| ○ · · · · | 5 | function spec | 12 | 5 | | 98/06/26 |
| ○ · · · · | 6 | X-2 report | | 50 | | 98/06/26 |
| ○ · · · · | 7 | X-2 report | | 45 | | 98/06/26 |
| ○ · · · · | 8 | installer spec | 1 (all) | 32 | A | 98/06/26 |
| ○ · · · · | 9 | menu spec | 2-1 | 12 | B | 98/06/26 |
| ○ · · · · | 10 | menu spec | 2-2 | 14 | B | 98/06/26 |
| ○ · · · · | 11 | menu spec | 3-1 | 36 | A | 98/06/26 |
| ○ · · · · | 12 | X-1 report | | 50 | | 98/06/26 |
| ○ · · · · | 13 | X-1 report | | 50 | | 98/06/26 |
| ○ · · · · | 14 | function spec | 11 | 11 | C | 98/06/26 |
| △ · · · · | * | | | | | |

FIG. 5B

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| □ · · · · | * | | | | | |

FIG. 6A

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| □ · · · · | * | | | | | |
| | | | | | | |

FIG. 6B

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | | | 10 | | 98/06/26 |
| ○ · · · · | 5 | | | 10 | | 98/06/26 |
| ○ · · · · | 6 | | | 5 | | 98/06/26 |
| △ · · · · | * | | | | | |

FIG. 7A

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ● · · · · | 4 | ▼ | | 10 | | 98/06/26 |
| ○ · · · · | 5 | | | 10 | | 98/06/26 |
| ○ · · · · | 6 | | | 5 | | 98/06/26 |
| □ · · · · | * | | | | | |

FIG. 7B

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ● · · · · | 6 | menu spec | 3-2 | 5 | B ▼ | 98/06/26 |
| △ · · · · | * | | | | | |

FIG. 8A

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| ☐ · · · · | * | ▼ | | | | |

FIG. 8B

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| △ · · · · | 7 | X-11 report | 1 | 0 | | |
| △ · · · · | 8 | X-11 report | 2 | 0 | | |
| △ · · · · | 9 | X-12 report | 1 ▼ | 0 | | |
| ☐ · · · · | * | | | | | |

FIG. 9A

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| △ · · · · | 7 | X-11 report | 1 | 0 | | |
| △ · · · · | 8 | X-11 report | 2 | 0 | | |
| △ · · · · | 9 | X-12 report | 1 | 0 | | |
| □ · · · · | * | | | | | |

FIG. 9B

| PROPERTIES | NO. | TITLE | CHAPTER | PAGES | RANK | ENTRY DATE |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| ○ · · · · | 7 | X-11 report | 1 | 12 | | 98/06/26 |
| ○ · · · · | 8 | X-11 report | 2 | 8 | | 98/06/26 |
| ○ · · · · | 9 | X-12 report | 1 | 22 | | 98/06/26 |
| ○ · · · · | * | | | | | |

FIG. 15

| DIRECTORY INFORMATION |
|---|
| DOCUMENT SEARCH, DOCUMENT RECORD, AND INDEX INPUT PROCESS MODULE SHOWN IN FIG. 3 |
| IMAGE DISPLAY PROCESS MODULE SHOWN IN FIG. 12 |
| IMAGE DISPLAY PROCESS MODULE SHOWN IN FIG. 13 |
| IMAGE DISPLAY PROCESS MODULE SHOWN IN FIG. 14 |
| ⋮ |

PRIOR ART

FILE MANAGEMENT SYSTEM AND ITS METHOD AND STORAGE MEDIUM

BACKGROUND OF THE INVENTION

1. Field of the Invention

The present invention relates to a file management system, a file management method, and a storage medium, and particularly to a file management system having a plurality of files stored therein and having a file list which is a list of the stored files, a file management method applied to the file management system, and a storage medium for storing a program for executing the file management method.

2. Related Background Art

Conventionally, there is known an image management system in which a manuscript image such as a document or a drawing is read and appropriately edited and the image is recorded to a magnetic disk or an optical magnetic disk for a management.

In general, in this type of an image management system, image information obtained by reading a manuscript image is compressed before being recorded to a hard disk or an optical disk. In addition, index information for an image search is related to the image information for recording.

A required image is searched for from this index information and the image information is read out to be displayed on a display unit or the image is output to a record sheet by a printer. Furthermore, various types of image processing such as adding, editing, or processing an image is performed, if necessary.

Referring to FIGS. 16A and 16B, there is shown a block diagram of a constitution of a conventional and general image filing system. FIG. 16A illustrates a constitution for scanning a manuscript using a scanner and storing the image in a document data base. A scanner 120 electrically reads a manuscript and converts the read image to digital signals using a photoelectric conversion element or the like. A scanner control portion 121 controls an operation of the scanner 120.

An index input portion 123 inputs an index for the read image. A data base management portion 122 manages the index and the image. A document data base 124 is used for storing image or index information.

First, an image read from a manuscript with the scanner 120 is sent to the data base management portion 122 via the scanner control portion 121. In the data base management portion 122, index information inputted from the index input portion 123 is added to the image received from the scanner control portion 121 and they are stored in the document data base 124.

FIG. 16B illustrates a constitution for searching for a desired image from the document data base by using a search portion. A document data base 130 is used for storing images and indices therefor. A data base management portion 131 manages the document data base 130.

A search portion 132 searches for a desired image from the document data base 130 and it searches for an image according to search conditions inputted from a search condition input portion 133. A search results list management portion 134 manages search results. A reference numeral 135 indicates a search results list. The search results list management portion 134 is capable of giving instructions on sending image information to an image display portion 141 via an image display control portion 140 to display the image or on sending image information to a printer 143 via a printer control portion 142 to print out the image regarding the document which has been searched for on the basis of the search results list 135.

In the above conventional image management system, however, there are problems described below and an improvement of the problems has been desired. In other words, a document recording operation is separated from a search operation.

Also in the recording operation, fixed procedures have been used for the image scanning and the index input operation. Furthermore, in the recording operation, the document recording and the index input operation have been performed for each document.

Therefore, an operator must perform the scanning and the index input operation alternately, which makes operations complicated and leads to a low productivity. Additionally, due to the separation of the recording operation from the search operation, an incorrect data inputted by an incorrect operation must be modified following a search operation after the recording operation is terminated, which requires a lot of operation steps and operation time.

It is the same regarding a document display; a lot of operation steps and operation time are required during an index input operation, for example, for displaying images on other documents for reference.

SUMMARY OF THE INVENTION

Therefore it is an object of the present invention to provide a document management system, its method, and a storage medium, having improved operability by integrating a search operation, an image recording operation, and an index input operation so that a plurality of documents can be processed at a time.

It is another object of the present invention to provide a file management system, its method, and a storage medium, in which a file image display and a printing operation can also be easily operated on an integrated document list.

According to one aspect, it is an object of the present invention to provide a file management system comprising an input means for inputting image information, index information input means for inputting index information related to the image information, a file management means for managing the image information and the index information as an image file, a display control means for controlling to display a plurality of image files managed by the file management means as a file list, and an input control means for controlling an input order of the input means and the index information input means so that it can be selected when recording image files in the file list.

BRIEF DESCRIPTION OF THE DRAWINGS

FIG. 4 is a diagram showing a display screen of a document list W;

FIGS. 5A and 5B are diagrams showing a display screen in a search operation in the document list W;

FIGS. 6A and 6B are diagrams showing a display screen in a new recording operation in the document list W;

FIGS. 7A and 7B are diagrams showing a display screen in a post-input of index information in the document list W;

FIGS. 8A and 8B are diagrams showing a display screen in a pre-input of the index information in the document list W;

FIGS. 9A and 9B are diagrams showing a display screen in recording an image for a pre-input file of the index information in the document list W;

FIG. 15 is a diagram showing a memory map of a floppy disk as a storage medium;

DETAILED DESCRIPTION OF THE PREFERRED EMBODIMENTS

A description will be made below for embodiments of a file management system, its method, and a storage medium of the present invention. File management systems according to these embodiments are applied to a document management system, an image management system, or the like. The embodiments will be described below using a document management system.

[First Embodiment]
(Hardware Constitution)

Figure 1:
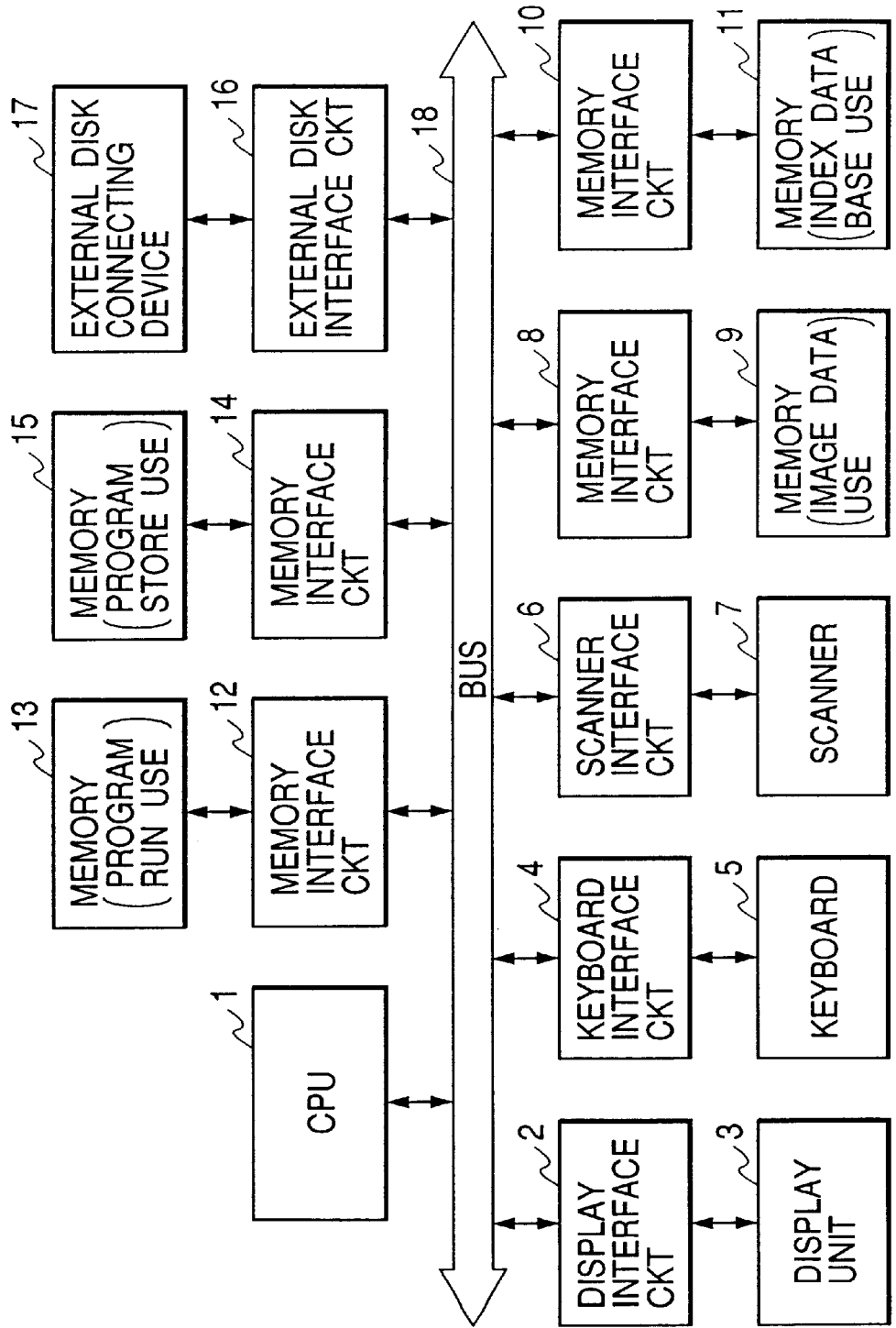
FIG. 1 is a block diagram of a hardware constitution of a document management system according to a first embodiment of the present invention.

Referring to FIG. 1, there is shown a block diagram of a constitution of a document management system according to a first embodiment.

In this diagram, a CPU 1 (a central processing unit) controls the entire document management system and is connected to a bus 18 for transmitting image information or instruction information of various operations.

A CRT display 3, which displays an image of the image information or a document list for a user, is connected to the bus 18 via a display interface circuit 2. A keyboard or a pointing device 5, which is used for a user to give instructions on various operations of the document management system, is connected to the bus 18 via a keyboard interface circuit 4.

A scanner 7, which reads image information from a subject, is connected to the bus 18 via a scanner interface circuit 6. A magnetic disk or an optical magnetic disk (memory for an image data use) 9, which is used for storing image information and identification information for managing each image information, is connected to the bus 18 via a memory interface circuit 8.

An index data base memory 11, in which is recorded a data base for storing various index information which has been inputted by a user with being related to the image identification information, is connected to the bus 18 via a memory interface circuit 10.

A RAM (a memory for a program run use) 13 used for running a program of a filing system is connected to the bus 18 via a memory interface circuit 12. A magnetic disk or an optical magnetic disk (a memory for a program store use) 15, which is used for storing the program of the filing system, is connected to the bus 18 via a memory interface circuit 14.

A disk drive (an external disk connecting device) 17, which is used for connecting a floppy disk or the like in which the program of the filing system is stored, is connected to the bus 18 via an external disk interface circuit 16.

Generally in this hardware constitution, a program for implementing a document management system is supplied by a floppy disk or the like. The program stored in the floppy disk is read from a disk drive 17 before using (running) the program and stored in the magnetic disk 15. Afterward, the program is loaded into the RAM 13 and run by the CPU 1. The program can also be downloaded via a network.

(Software Processing)

Figure 2:
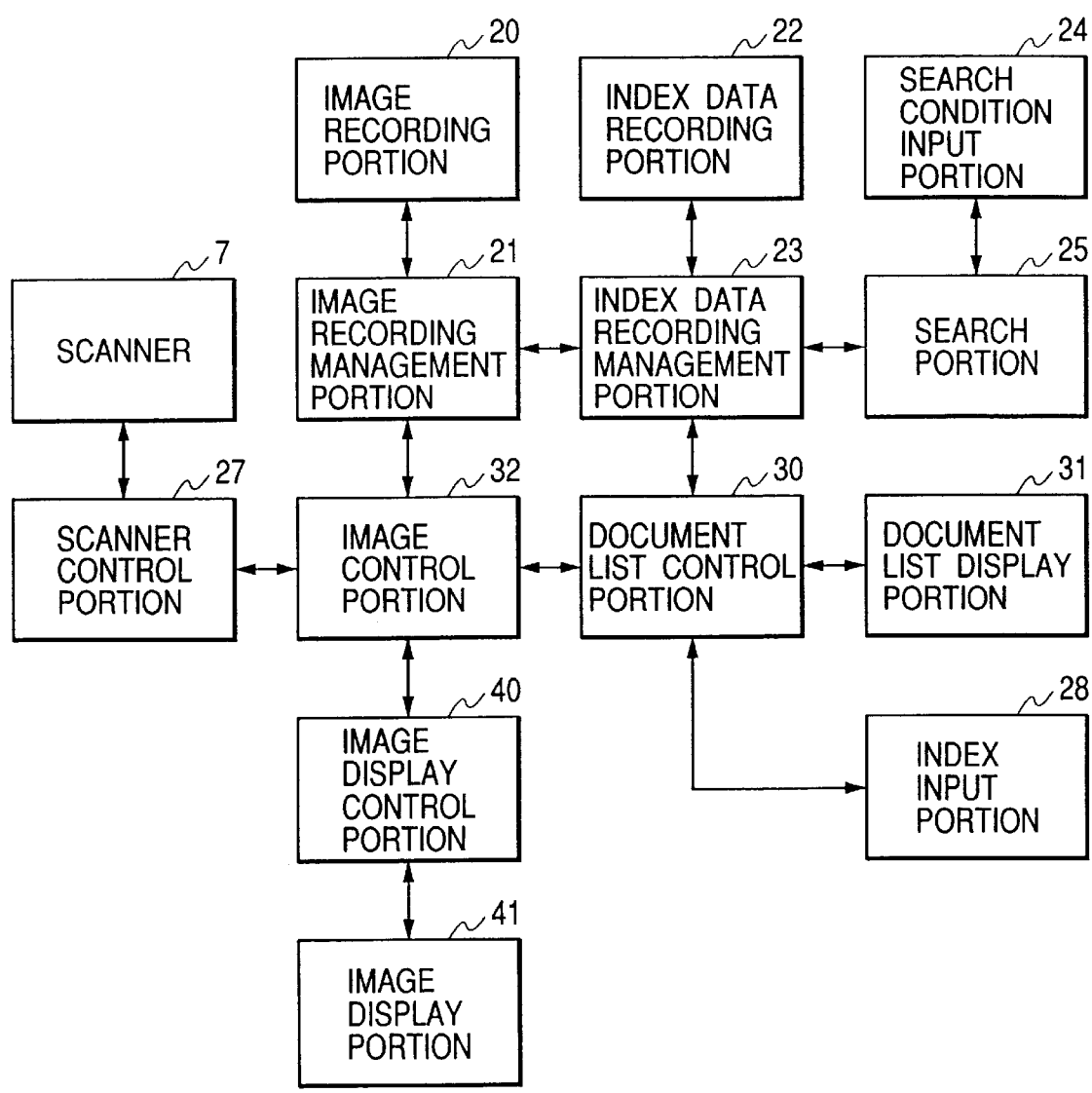
FIG. 2 is a diagram of a constitution of various functions achieved by executing a file management processing in the document management system.

Referring to FIG. 2, there is shown a block diagram of a processing function of the document management system implemented with the hardware constitution in FIG. 1. In this diagram, there are shown an image recording portion 20 for recording an image as document information, an image recording management portion 21 for managing data in the image recording portion 20 with keeping consistency, and an index data recording portion 22 for recording index data for searching for a document.

There are further shown an index data recording management portion 23 for managing data in the index data recording portion 22 with keeping consistency, a search condition input portion 24 for inputting search conditions for a search for a desired document, and a search portion 25 for a search for the desired document from the data base. The search condition input portion 24 comprises a keyboard and a search condition input screen.

A scanner 7 is used for reading image data from a manuscript such as a drawing, a scanner control portion 27 is for controlling the scanner 7, and an index input portion 28 is for inputting index data. A document list control portion 30 controls a document list display portion 31 which displays a document list. An image control portion 32 controls a document image and an image display control portion 40 controls an image display portion 41 to display the document image.

A document list control portion 30 controls the document list display portion 31 and is connected to the index data recording management portion 23, the image control portion 32, and the index input portion 28. The image control portion 32 is connected to the image recording management portion 21, the document list control portion 30, the scanner control portion 27, and the image display control portion 40.

A description will be made below for document search, document record, and index input operations in the document management system having the above constitution.

Figure 3:
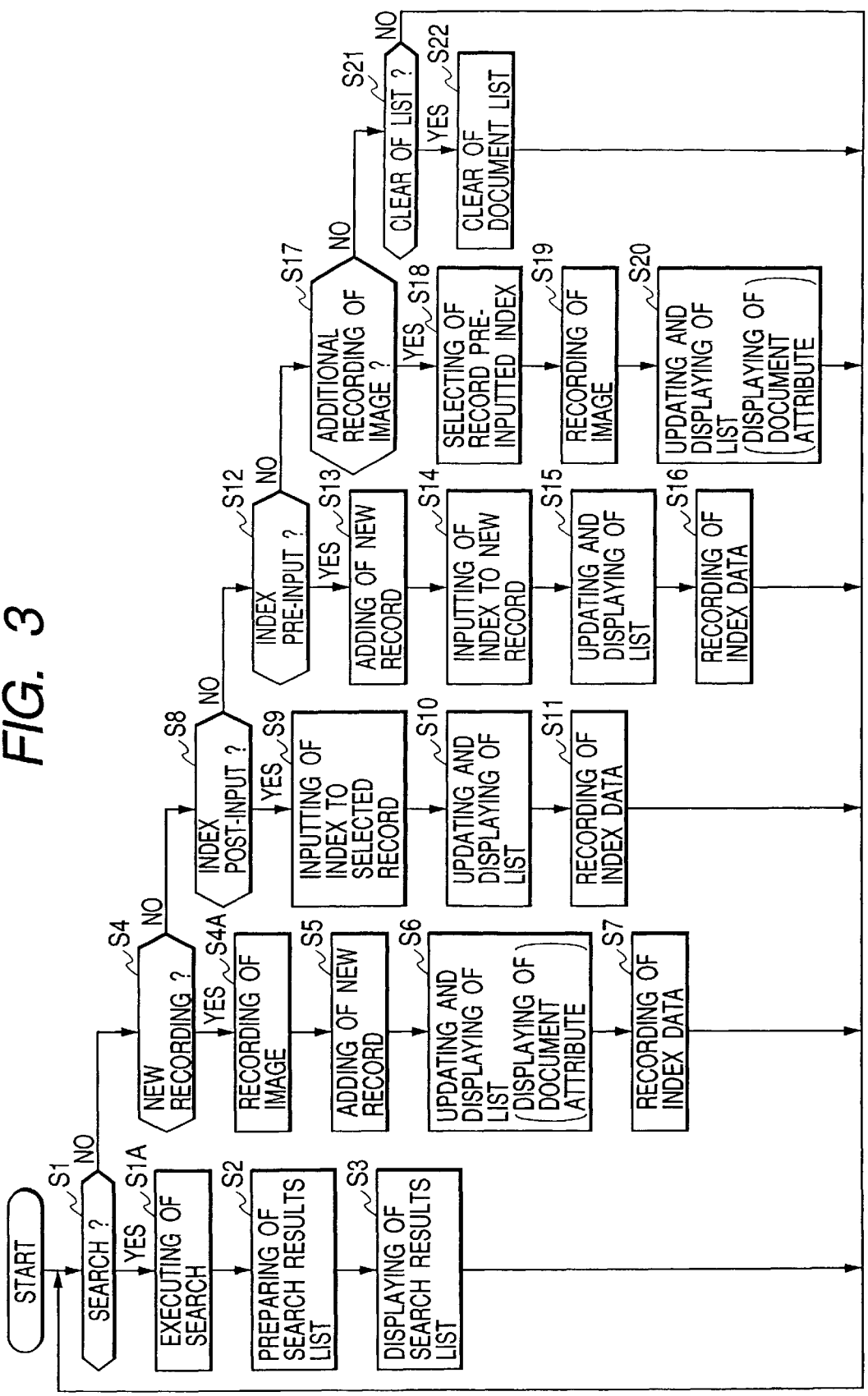
FIG. 3 is a flowchart of a document search, a document recording, and an index input operation procedures in the document management system.

Referring to FIG. 3, there is shown a flowchart of processing procedures of document search, document record, and index input operations in the document management system. This processing program is supplied with a floppy disk or the like as described above. The program stored in the floppy disk is read from the disk drive 17 before using (running) the program and stored in the magnetic disk 15. Afterward, the program is loaded into the RAM 13 and run by the CPU 1.

In this processing program, it is determined whether or not an instruction has been given on a search operation prior to a search condition inputted for searching for a desired document from the search condition input portion 24 (Step S1); if the instruction has been given on the search operation, the search operation is executed (Step S1A).

On the other hand, if the instruction has not been given on the search operation, it is determined whether or not it is new recording (Step S4); if it is not new recording, it is determined whether or not an index is post-inputted (Step S8). If the index is not post-inputted, it is determined whether or not the index is pre-inputted (Step S12); if the index is pre-inputted, it is determined whether or not an image is additionally recorded (Step S17). If an image is not additionally recorded, it is determined whether or not a document list is cleared (Step S21). If clearing a document list is specified, the document list is cleared (Step S22). Otherwise, the control returns to processing in step S1 directly.

A description will be made below for processing contents in a search operation, new recording, an index post-input operation, an index pre-input operation, and an image addition or recording operation.

(Search Operation)

First, a user gives an instruction on a search operation. Subsequently the user inputs search conditions for searching for a desired document from the search condition input portion 24. As the search conditions, there are keywords, for example. The inputted search conditions are transmitted to the search portion (generally referred to as a search engine) 25, and the search portion 25 finds out a document which satisfies the search conditions from the document data base via the index data recording management portion 23 for managing data of the index data recording portion 22 and outputs the result to the document list control portion 30 (Step S1A).

If it finds out a document satisfying the search conditions, the document list control portion 30 prepares a document list from the result (Step S2) and displays it to the document list display portion 31 (generally, comprising a CRT and CRT control circuit) (Step S3).

(New Recording)

A user starts the scanner control portion 27 to read a new document from the scanner 7. The scanner 7 reads a content of a predetermined number of manuscript sheets and outputs image data of the read manuscript sheets to the image control portion 32. The image control portion 32 records the image data into the image recording portion 20 via the image recording management portion 21 and reports new document creating information to the document list control portion 30 (Step S4A).

The document list control portion 30 creates a new record on the basis of the new document creating information and adds it to the already displayed document list for a display (Step S5). On this record are updated document attributes defined at scanning corresponding to the document inputted from the scanner 7 such as an entry date and the number of pages (Step S6). The updated document attributes are recorded into the index data recording portion 22 via index data recording management portion 23 (Step S7).

(Index Post-input)

A user instructs the document list control portion 30 to start an index input (Step S8). This instruction puts the document list control portion 30 in a mode for receiving an output from the index input portion 28. The user inputs a desired index (in this case, of a document scanned anew) from the index input portion 28 (Step S9). The inputted index is displayed at a prescribed place in the list by the document list control portion 30 (Step S10). The inputted index data is recorded into the index data recording portion 22 via the index data recording management portion 23 automatically or by a user's instruction to the document list control portion 30 (Step S11).

(Index Pre-input)

In an index pre-input operation in which index information is inputted prior to an input of a document, a user instructs the document list control portion 30 to perform an index pre-input operation (Step S12). By this instruction, the document list control portion 30 enables an index input which is currently not related to image data for a new record at the lowest end of the document list (Step S13). Then, the user inputs a new index data from the index input portion 28 (Step S14). This data is displayed in the document list by the document list control portion 30 (Step S15) and recorded into the index data recording portion 22 via the index data recording management portion 23, if necessary (Step S16).

(Recording Image for Index Pre-input Record)

A user inputs image data corresponding to the above index pre-input record (Step S17). The user selects an index pre-input record for which the image data is inputted for the document list control portion 30 (Step S18), first. Next, the image data is read from the scanner 7 with the scanner control portion 27 (Step S19). The image data is sent to the image display portion 41 via the image display control portion 40 by the image control portion 32 and sent to the image recording management portion 21 so as to be recorded into the image recording portion 20. The image recording portion 20 transmits address information of the recorded image to the document list control portion 30 via the image control portion 32 or directly.

Read-in information such as the number of document pages is sent from the image control portion 32 to the document list control portion 30. The document list control portion 30 records this read-in information into the index data recording portion 22 via the index data recording management portion 23 and changes a status of the corresponding record in the document list from the index pre-input record to an ordinary document. Furthermore, the document list control potion 30 updates a display of the document list (Step S20). It is also possible for the system to have a constitution in which the address information of the recorded image is directly transmitted from the image recording management portion 21 to the index data recording management portion 23.

Then, the control returns to processing in Step S1 after the above search operation, new recording, index post-input, index pre-input, and additional recording of an image.

(Constitution of Document List)

Referring to FIG. 4, there is shown a diagram of a display screen of the document list W. The document list W is created by the document list control portion 30 and displayed on the CRT. In this document list W, files as a search result and new files inputted from the scanner are displayed. A property column 51 indicates a file status, a file number column 52 indicates a number in the list, and columns 53 and 54 indicate document index items. A column 55 indicates the number of pages of each file and a column 57 indicates an entry date when an image of a subject is recorded by the scanner 7.

A user can freely design the index items according to a type of the document by using a data base structure setting portion which is not shown. In the example shown in FIG. 4, a Title item 53 for indicating a document title, a Chapter item 54 for indicating each end of chapters in a document, and a Rank item 56 for indicating an evaluation of a document are added as the index information for a document management. The order of these columns can be arbitrarily changed.

The document list W in FIG. 4 shows image recorded files and index pre-input files each having only previously inputted index on the same screen in a manner in which a user can clearly distinguish between them. Icons (○, Δ) in the items 58 and 59 indicate states of respective files in the Properties column 51; an icon 58 (○) indicates that image information is already recorded in a file, an icon 59 (Δ) indicates that image information has not been recorded yet in a file and it is an index pre-input file. Therefore, in the document list W in FIG. 4, it is easily understood that the files having file numbers 1 to 10 indicated by ranges 60 and 61 are image recorded files and that the files having file numbers 11 to 15 indicated by range 62 are index pre-input files.

The files in the range 60 are existing files in which image information and index information displayed as a result of a search with the search portion 25 are recorded, the files in the range 61 are new files in which image information is stored while index information is not inputted, and the files in the range 62 are pre-index files in which only index information is recorded.

(Search Operation)

Referring to FIGS. 5A and 5B, there is shown a diagram of a display screen for executing a search operation in the document list W. The document list W in FIG. 5A shows a display status of all documents stored without search conditions and it is an example of an initial status. If a user inputs "A" in the Rank column as a search condition in the search condition input portion 24 at this point, the search portion 25 finds out a record (file) satisfying the search condition from the index data recording portion 22 via the index data recording management portion 23 on the basis of the search condition and outputs the result to the document list control portion 30. The document list control portion 30 creates a document list based on the result and displays it in the document list display portion 31. FIG. 5B shows a display screen of a document list W which has been created with this search operation and displayed.

(New Recording)

Referring to FIGS. 6A and 6B, there is shown a diagram of a display screen for executing a new recording operation in the document list W. A document list prior to new recording is shown in FIG. 6A. Now, a new document is read using the scanner 7 and new document creating information is reported to the document list control portion 30.

The document list control portion 30 creates a new record on the basis of the new document creating information and adds it to the already displayed document list for a display. Created and updated document attributes are recorded into the index data recording portion 22 via the index data recording management portion 23. FIG. 6B shows a display screen of a document list W which is displayed after this recording operation of the new document. Records (files) having file numbers 4, 5, and 6 have been created and there are displayed the number of pages corresponding to the image information scan, entry dates, and icons in the Properties column for indicating file attributes.

(Index Post-input)

Referring to FIGS. 7A and 7B, there is shown a diagram of a display screen for executing an index information post-input operation in the document list W. A user instructs the document list control portion 30 to start an index input. This instruction causes the document list control portion 30 to enter a mode for receiving an output from the index input portion 28 as shown in FIG. 7A.

A user inputs a predetermined index from the index input portion 28. The input index is displayed at a prescribed place in the list by the document list control portion 30 and is recorded into the index data recording portion 22 via the index data recording management portion 23 automatically or by a user's instruction to the document list control portion 30.

After a completion of an input operation of a single index item, it is possible to start an input operation of the next index item (in the next column on the right side, for example). In the same manner, after a completion of an index input operation into a single record (file), it is possible to start an index input operation into the next record (file) (in the next row of the list, for example).

For example, an index input is started from the Title column of the file number 4 as shown in FIG. 7A and the index input operation is continuously performed up to the Rank column of the file number 6 as shown in FIG. 7B.

Furthermore, it is also possible to limit a specification of input columns to Chapter and Rank for a continuous input.

(Index Pre-input)

Referring to FIGS. 8A and 8B, there is shown a diagram of a display screen for executing an index information pre-input operation in the document list W.

A user instructs the document list control portion 30 to start an index pre-input. This instruction causes the document list control portion 30 to enable an index input currently not related to image data for the lowest new record in the document list as shown in FIG. 8A.

A user inputs new index data from the index input portion 28. This data is displayed in the document list by the document list control portion 30 and is recorded into the index data recording portion 22 via the index data recording management portion 23, if necessary.

After a completion of an input operation of a single index item, it is possible to start an input operation of the next index item. In the same manner, after a completion of an index input operation into a single record (file), it is possible to start an index input operation for the next record (file), and at this point a file not related to the image data is created as an index pre-input file. For example, an index input is started from the Title column of the new file as shown in FIG. 8A and the index input operation is continuously performed up to the Chapter column of the file number 9 as shown in FIG. 8B. The index pre-input files having the file numbers 7, 8, and 9 are created in this manner.

(Recording Image into Index Pre-input Record)

Referring to FIGS. 9A and 9B, there is shown a display screen for recording an image into a pre-input file of the index information in the document list W. A user selects an index pre-input record in which image data is to be inputted as shown in FIG. 9A for the document list control portion 30, first.

The image data is read from the scanner 7 by the scanner control portion 27. The image data is sent to the image display portion 41 via the image display control portion 40 by the image control portion 32 and sent to the image recording management portion 21 so as to be recorded into the image recording portion 20. The image recording portion 20 transmits address information of the recorded image to the document list control portion 30 via the image control portion 32 or directly.

Read-in information such as the number of document pages is sent from the image control portion 32 to the document list control portion 30. The document list control portion 30 records this read-in information into the index data recording portion 22 via the index data recording management portion 23 and changes a status of the corresponding record in the document list from the index pre-input record to an ordinary document.

Furthermore, the document list control potion 30 updates a display of the document list. FIG. 9B shows a display screen of the document list W which has been created by this recording operation of the new document and displayed. Image information is inputted into the files having file numbers 7, 8, and 9 and the number of pages, the entry dates, and the icons of the Properties column for indicating file attributes are updated in the list.

While individual operations have been described in order in this embodiment, the order of the operations are not limited to this, but they can be performed in a user's requested order of the prescribed operations as shown in the flowchart in FIG. 3.

[Second Embodiment]
(Hardware Constitution)

Figure 10:
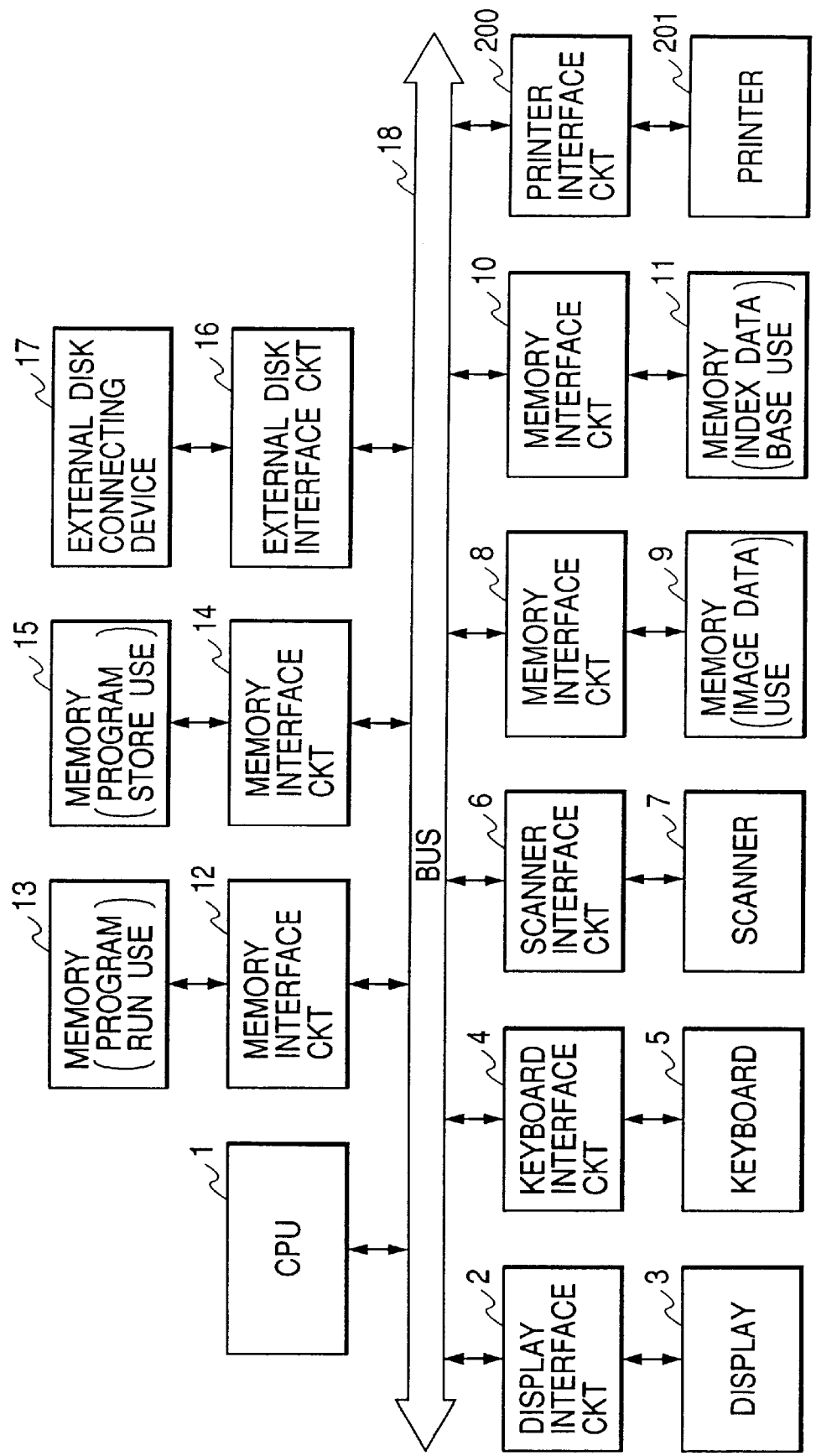
FIG. 10 is a block diagram showing a constitution of a file management system in a second embodiment.

Referring to FIG. 10, there is shown a block diagram of a constitution of a document management system in a second embodiment. Identical components in this embodiment to those of the first embodiment are designated by identical reference numerals. In this diagram, a CPU (a central processing unit) 1 controls the entire document management system and is connected to a bus 18 for transmitting image information or instruction information of various operations.

A CRT display 3, which displays an image of the image information or a document list for a user, is connected to the bus 18 via a display interface circuit 2. A keyboard or a pointing device 5, which is used for a user to give instructions on various operations of the document management system, is connected to the bus 18 via a keyboard interface circuit 4.

A scanner 7, which reads image information from a subject, is connected to the bus 18 via a scanner interface circuit 6. A magnetic disk or an optical magnetic disk (memory for an image data use) 9, which is used for storing image information and identification information for managing each image information, is connected to the bus 18 via a memory interface circuit 8.

An index data base memory 11, in which is recorded a data base for storing various index information inputted by a user with being related to the image identification information, is connected to the bus 18 via a memory interface circuit 10.

A RAM (a memory for a program run use) 13 used for running a program of a filing system is connected to the bus 18 via a memory interface circuit 12. A magnetic disk or an optical magnetic disk (a memory for a program store use) 15, which is used for storing the program of the filing system, is connected to the bus 18 via a memory interface circuit 14.

A disk drive (an external disk connecting device) 17, which is used for connecting a floppy disk or the like in which the program of the filing system is stored, is connected to the bus 18 via an external disk interface circuit 16.

A printer 201, which is used for printing an image of the image information or a document list, is connected to the bus 18 via a printer interface circuit 200.

Generally in this hardware constitution, a program for implementing a document management system is supplied by a floppy disk or the like. The program stored in the floppy disk is read from a disk drive 17 before using (running) the program and stored in the magnetic disk 15. Afterward, the program is loaded into the RAM 13 and run by the CPU 1. The program can also be downloaded via a network.

(Software Processing)

Figure 11:
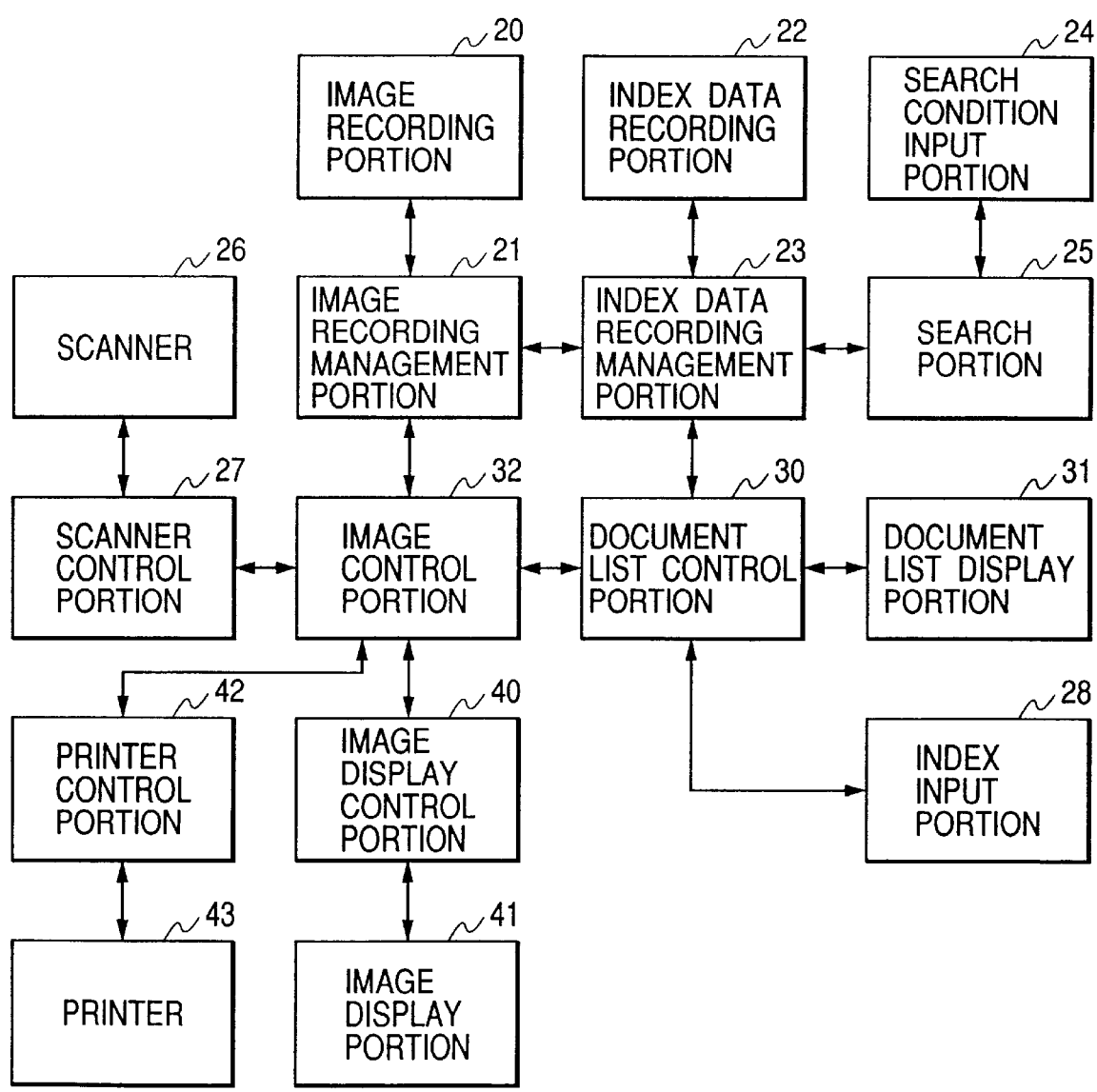
FIG. 11 is a block diagram showing a processing function of the file management system implemented with the hardware constitution in FIG. 10.

Referring to FIG. 11, there is shown a block diagram of a processing function of the document management system implemented with the hardware constitution in FIG. 10. In this diagram, there are shown an image recording portion 20 for recording an image as document information, an image recording management portion 21 for managing data in the image recording portion 20 with keeping consistency, and an index data recording portion 22 for recording index data for searching for a document.

There are further shown an index data recording management portion 23 for managing data in the index data recording portion 22 with keeping consistency, a search condition input portion 24 for inputting search conditions for a search for a desired document, and a search portion 25 for a search for the desired document from the data base. The search condition input portion 24 comprises a keyboard and a search condition input screen.

A scanner 7 is used for reading image data from a manuscript, a scanner control portion 27 is for controlling the scanner 7, and an index input portion 28 is for inputting index data. A document list control portion 30 controls a document list display portion 31 which displays a document list. An image control portion 32 controls a document image and an image display control portion 40 controls an image display portion 41 to display the document image.

A document list control portion 30 controls the document list display portion 31 and is connected to the index data recording management portion 23, the image control portion 32, and the index input portion 28. The image control portion 32 is connected to the image recording management portion 21, the document list control portion 30, the scanner control portion 27, and the image display control portion 40. A printer control portion 42 controls the printer 40 to output the document image information to a record sheet and is connected to the image control portion 32.

A description will be made below for document search, document record, index input, image information displaying, and printing operations in the document management system having the above constitution. These operations are the same as those for the first embodiment shown in a flowchart of FIG. 3 except the image information display and printing operation.

(Search Operation)

First, a user inputs search conditions for searching for a desired document from the search condition input portion 24. As the search conditions, there are keywords, for example. The inputted search conditions are transmitted to the search portion (generally referred to as a search engine) 25, and the search portion 25 finds out a document which satisfies the search conditions from the document data base via the index data recording management portion 23 for managing data of the index data recording portion 22 and outputs the result to the document list control portion 30. The document list control portion 30 prepares a document list from the result and displays it to the document list display portion 31 (generally, comprising a CRT and CRT control circuit).

(New Recording)

A user starts the scanner control portion 27 to read a new document from the scanner 7. The scanner 7 reads a content of a predetermined number of manuscript sheets and outputs the image data to the image control portion 32. The image control portion 32 records the image data into the image recording portion 20 via the image recording management portion 21 and reports new document creating information to the document list control portion 30.

The document list control portion 30 creates a new record on the basis of the new document creating information and adds it to the already displayed document list for a display. On this record are updated document attributes defined at scanning corresponding to the document inputted from the scanner 7 such as an entry date and the number of pages. The updated document attributes are recorded into the index data recording portion 22 via index data recording management portion 23.

(Index Post-input)

A user instructs the document list control portion 30 to start an index input. This instruction puts the document list control portion 30 in a mode for receiving an output from the index input portion 28. The user inputs a desired index (in this case, of a document scanned anew) from the index input portion 28. The inputted index is displayed at a prescribed place in the list by the document list control portion 30. The inputted index data is recorded into the index data recording portion 22 via the index data recording management portion 23 automatically or by a user's instruction to the document list control portion 30.

(Index Pre-input)

A description will be made below for an index pre-input operation in which index information is inputted prior to an input of a document. A user instructs the document list control portion 30 to perform an index pre-input operation. By this instruction, the document list control portion 30 enables an index input which is currently not related to image data for a new record at the lowest end of the document list. Then, the user inputs a new index data from the index input portion 28. This data is displayed in the document list by the document list control portion 30 and recorded into the index data recording portion 22 via the index data recording management portion 23, if necessary.

(Recording Image for Index Pre-input Record)

A user inputs image data corresponding to the above index pre-input record. The user selects an index pre-input record for which the image data is inputted for the document list control portion 30, first. Next, the image data is read from the scanner 7 by the scanner control portion 27.

The image data is sent to the image display portion 41 via the image display control portion 40 by the image control portion 32 and sent to the image recording management portion 21 so as to be recorded into the image recording portion 20. The image recording portion 20 transmits address information of the recorded image to the document list control portion 30 via the image control portion 32 or directly.

Read-in information such as the number of document pages is sent from the image control portion 32 to the document list control portion 30. The document list control portion 30 records this read-in information into the index data recording portion 22 via the index data recording management portion 23 and changes a status of the corresponding record in the document list from the index pre-input record to an ordinary document. Furthermore, the document list control potion 30 updates a display of the document list. It is also possible for the system to have a constitution in which the address information of the recorded image is directly transmitted from the image recording management portion 21 to the index data recording management portion 23.

(Image Information Displaying and Printing)

A user can select an arbitrary file out of the document list to display or print the image information. If the user selects an arbitrary file out of the document list and gives an instruction on displaying the image with the keyboard 5, the document list control portion 30 obtains search information of the image of the file selected out of the index data recording portion 22 via the index data recording and management portion 23.

Subsequently, the document list control portion 30 sends the search information of the image and an instruction on displaying the image to the image control portion 32. The image control portion 32 obtains image information from the image recording portion 20 via the image recording management portion 21 on the basis of the received search information of the image and sends the obtained image information to the image display control portion 40. The image display control portion 40 displays the received image information on the image display portion 41.

In the same manner for printing the image information, the document list control portion 30 receives the image information selected by the user and sends the search information and an instruction on printing the image to the image control portion 32, and the image control portion 32 obtains image information from the image recording portion 20 via the image recording management portion 21 on the basis of the search information of the received image and sends the obtained image information to the printer control portion 42. The printer control portion 42 prints out the received image information by the printer 41.

(Constitution of Document List)

A display screen of the document list W is the same as the above screen shown in FIG. 4. The document list W is created by the document list control portion 30 and displayed on the CRT. In this document list W, files as a search result and new files inputted from the scanner are displayed. A property column 51 indicates a file status, a file number column 52 indicates a number in the list, and columns 53 and 54 indicate document index items. A column 55 indicates the number of pages of each file and a column 57 indicates an entry date when an image of a subject is recorded by the scanner 7.

A user can freely design the index items according to a type of the document by using a data base structure setting portion which is not shown. In the example shown in FIG. 4, a title item 53 for indicating a document title, a chapter item 54 for indicating each end of chapters in a document, and a rank item 56 for indicating an evaluation of a document are added as the index information for a document management. The order of these columns can be arbitrarily changed.

The document list W in FIG. 4 shows image recorded files and index pre-input files each having only previously inputted index on the same screen in a manner in which a user can clearly distinguish between them. Icons (○, Δ) in the items 58 and 59 indicate states of respective files in the Properties column 51; an icon 58 (○) indicates that image information is already recorded in a file, an icon 59 (Δ) indicates that image information has not been recorded yet in a file and it is an index pre-input file. Therefore, in the document list W in FIG. 4, it is easily understood that the files having file numbers 1 to 10 indicated by ranges 60 and 61 are image recorded files and that the files having file numbers 11 to 15 indicated by range 62 are index pre-input files.

The files in the range 60 are existing files in which image information and index information displayed as a result of a search with the search portion 25 are recorded, the files in the range 61 are new files in which image information is stored while index information has not been inputted yet, and the files in the range 62 are pre-index files in which only index information is recorded.

(Search Operation)

A display screen for executing a search operation in the document list W is the same as the above screen shown in FIGS. 5A and 5B. The document list W in FIG. 5A shows a display status of all documents stored without search conditions and it is an example of an initial status. If a user inputs "A" in the Rank column as a search condition in the search condition input portion 24 at this point, the search portion 25 finds out a record (file) satisfying the search condition from the index data recording portion 22 via the index data recording management portion 23 on the basis of the search condition and outputs the result to the document list control portion 30. The document list control portion 30 creates a document list based on the result and displays it in the document list display portion 31. FIG. 5B shows a display screen of a document list W which has been created with this search operation and displayed.

(New Recording)

A display screen for executing a new recording operation in the document list W is the same as the screen shown in FIGS. 6A and 6B. A document list prior to new recording is shown in FIG. 6A. Now, a new document is read using the scanner 7 and new document creating information is reported to the document list control portion 30.

The document list control portion 30 creates a new record on the basis of the new document creating information and adds it to the already displayed document list for a display. Created and updated document attributes are recorded into the index data recording portion 22 via the index data recording management portion 23. FIG. 6B shows a display screen of a document list W which is displayed after this recording operation of the new document. Records (files) having file numbers 4, 5, and 6 have been created and there are displayed the number of pages corresponding to the image information scan, entry dates, and icons in the Properties column for indicating file attributes.

(Index Post-input)

A display screen for executing an index information post-input operation in the document list W is the same as the above screen shown in FIGS. 7A and 7B. A user instructs the document list control portion 30 to start an index input. This instruction causes the document list control portion 30 to enter a mode for receiving an output from the index input portion 28 as shown in FIG. 7A.

A user inputs a desired index from the index input portion 28. The input index is displayed at a prescribed place in the list by the document list control portion 30 and is recorded into the index data recording portion 22 via the index data recording management portion 23 automatically or by a user's instruction to the document list control portion 30.

After a completion of an input operation of a single index item, it is possible to start an input operation of the next index item (in the next column on the right side, for example). In the same manner, after a completion of an index input operation into a single record (file), it is possible to start an index input operation into the next record (file) (in the next row of the list, for example). For example, an index input is started from the Title column of the file number 4 as shown in FIG. 7A and the index input operation is continuously performed up to the Rank column of the file number 6 as shown in FIG. 7B.

Furthermore, it is also possible to limit a specification of input columns to Chapter and Rank for a continuous input.

(Index Pre-input)

A display screen for executing an index information pre-input operation in the document list W is the same as the above screen shown in FIGS. 8A and 8B. A user instructs the document list control portion 30 to start an index pre-input. This instruction causes the document list control portion 30 to enable an index input currently not related to image data for the lowest new record in the document list as shown in FIG. 8A.

A user inputs new index data from the index input portion 28. This data is displayed in the document list by the document list control portion 30 and is recorded into the index data recording portion 22 via the index data recording management portion 23, if necessary.

After a completion of an input operation of a single index item, it is possible to start an input operation of the next index item. In the same manner, after a completion of an index input operation into a single record (file), it is possible to start an index input operation for the next record (file), and at this point a file not related to the image data is created as an index pre-input file. For example, an index input is started from the Title column of the new file as shown in FIG. 8A and the index input operation is continuously performed up to the Chapter column of the file number 9 as shown in FIG. 8B. The index pre-input files having the file numbers 7, 8, and 9 are created in this manner.

(Recording Image into Index Pre-input Record)

A display screen for recording an image into a pre-input file of the index information in the document list W is the same as the screen shown in FIGS. 9A and 9B. A user selects an index pre-input record in which image data is to be inputted as shown in FIG. 9A for the document list control portion 30, first.

The image data is read from the scanner 7 by the scanner control portion 27. The image data is sent to the image display portion 41 via the image display control portion 40 by the image control portion 32 and sent to the image recording management portion 21 so as to be recorded into the image recording portion 20. The image recording portion 20 transmits address information of the recorded image to the document list control portion 30 via the image control portion 32 or directly.

Read-in information such as the number of document pages is sent from the image control portion 32 to the document list control portion 30. The document list control portion 30 records this read-in information into the index data recording portion 22 via the index data recording management portion 23 and changes a status of the corresponding record in the document list from the index pre-input record to an ordinary document.

Furthermore, the document list control portion 30 updates a display of the document list. FIG. 9B shows a display screen of the document list W which has been created by this recording operation of the new document and displayed. Image information is inputted into the files having file numbers 7, 8, and 9 and the number of pages, the entry dates, and the icons of the Properties column for indicating file attributes are updated in the document list.

Figure 12:
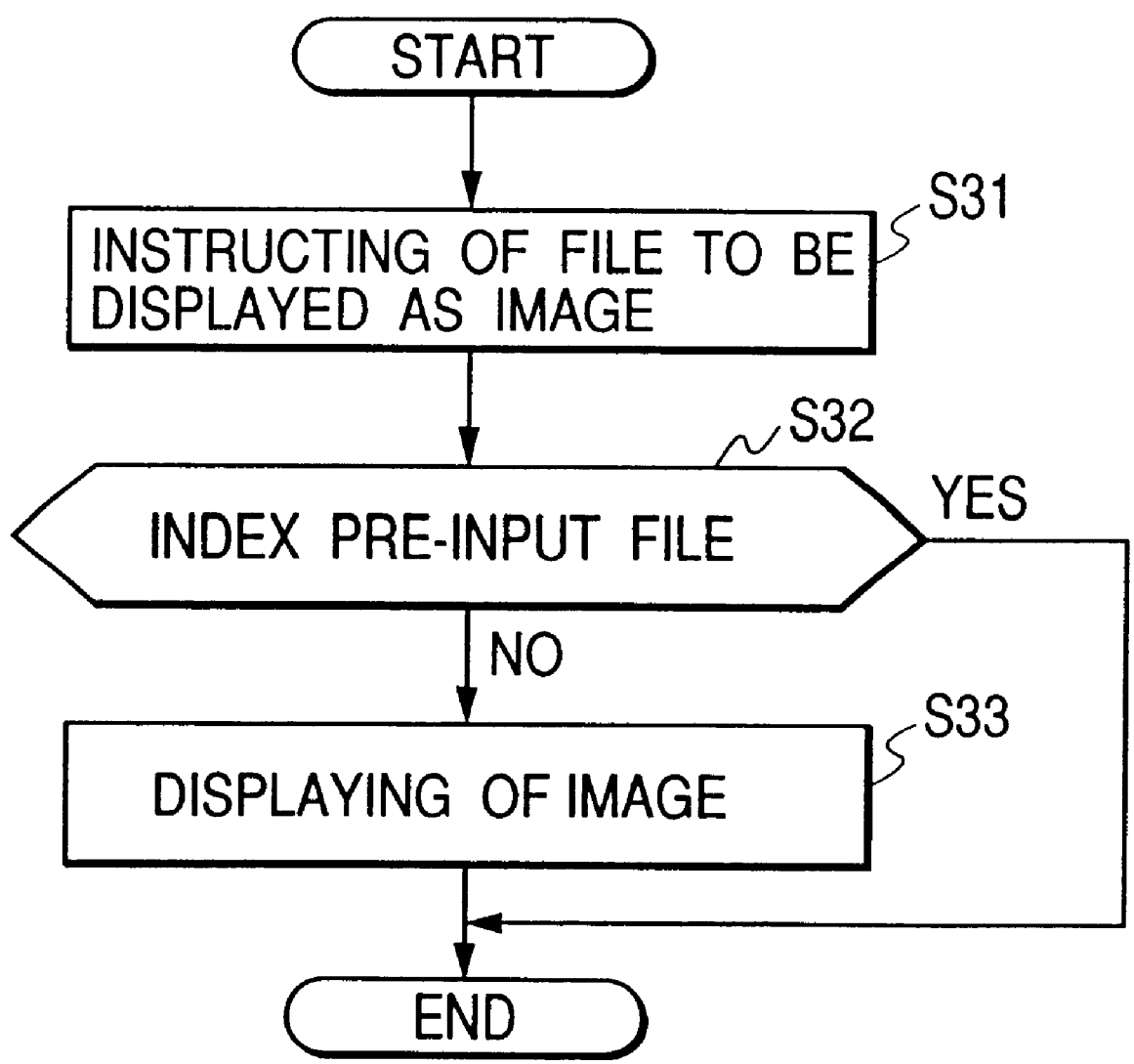
FIG. 12 is a flowchart of an image display processing procedure.

Referring to FIG. 12, there is shown a flowchart of an image display processing procedure. This processing program is read from the disk drive 17 and stored in the magnetic disk 15 as described above. Afterward, the program is loaded into the RAM 13 and run by the CPU 1. It is the same for the third and fourth embodiments described later.

First, a user selects an arbitrary file on the document list to give an instruction on displaying image (Step S31). The document list control portion 30 determines whether the file selected on the basis of the user's instruction is an existing file or a file scanned anew or an index pre-input file. (Step S32).

Unless it is an index pre-input file, image information exists in the file, and therefore identification information of the image information of the selected file is obtained from the index data recording portion 22 via the index data recording management portion 23. This obtained identification information and an image displaying request is transmitted to the image control portion 32.

The image control portion 32 obtains necessary image information from the image recording portion 20 via the image recording management portion 21 on the basis of the identification information sent from the document list management portion 30 and gives the image information to the image display portion 41 via the image display control portion 40 to display the image (Step S33).

On the other hand, if the file selected in Step S32 is an index pre-input file, image information does not exist in the file, and therefore no operation is performed, in other words, the instruction on displaying the image is ignored and processing is terminated.

While in this embodiment no operation is performed when a user selects an index pre-input file to instruct on displaying the image, a warning can be displayed for the user when the index pre-input file is selected.

In addition, while the operation on displaying the image is described in this embodiment, the same processing can be performed also for an output operation of the image information such as, for example, for a printing operation with the printer 43 via the printer control portion 42. It is the same in the third and fourth embodiments described later.

[Third Embodiment]

A hardware constitution of a third embodiment is the same as for the second embodiment, and therefore detailed description is omitted here.

In the third embodiment, a description will be made for selecting a file in the document list with the document list being linked with displaying an image. A hardware constitution of a document management system is the same as for the second embodiment, and therefore a detailed description is omitted here.

The operation depends upon a type of a file selection in a document list such as a selection of a specified file number (including a selection with a pointing device, a selection of a head file on the list, and a selection of an end file on the list), a selection of the next file, and a selection of the previous file.

Figure 13:
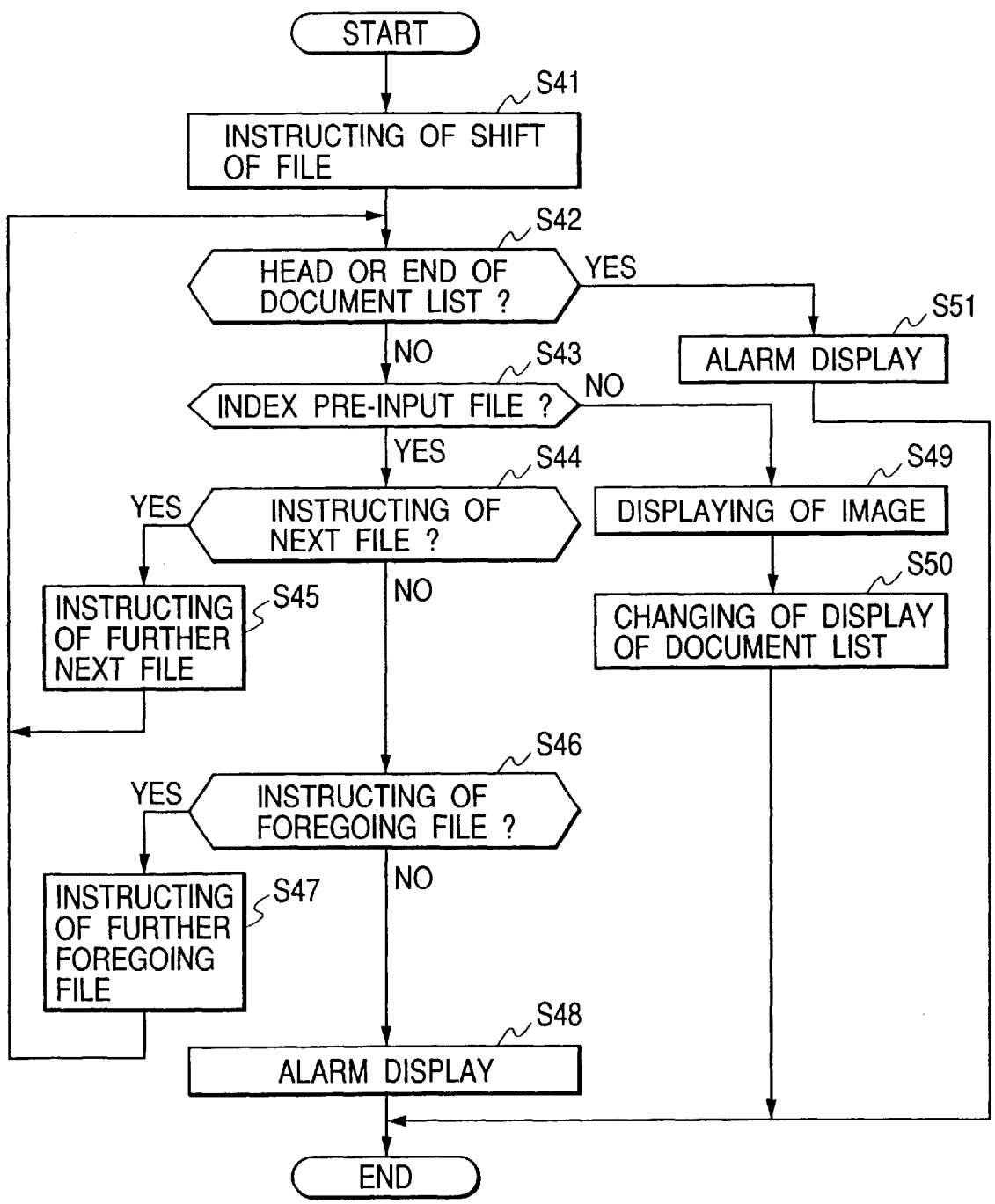
FIG. 13 is a flowchart of an image display processing procedure in a third embodiment.

Referring to FIG. 13, there is shown a flowchart of an image display processing procedure in the third embodiment. A user selects a file on a document list to give an instruction on displaying an image (Step S41). First, the document list control portion 30 determines whether or not a file selected by the user is within a range of the document list (Step S42). If it is outside the range, the file selection is not changed with displaying a warning which indicates that a file outside the range of the list is selected (Step S51) and processing is terminated.

On the other hand, if it is within the range of the list, it is determined whether the file selected by the user is an existing file or a file scanned anew or an index pre-input file (Step S43). Unless it is the index pre-input file, image information exists in the file, and therefore identification information of the image information of the selected file is obtained from the index data recording portion 22 via the index data recording management portion 23.

This obtained identification information and an image displaying request is transmitted to the image control portion 32. The image control portion 32 obtains necessary image information from the image recording portion 20 via the image recording management portion 21 on the basis of the identification information sent from the document list management portion 30 and gives the image information to the image display portion 41 via the image display control portion 40 to display the image (Step S49). In addition, the selected file in the document list is also changed, and therefore the document list control portion 30 changes the display of the document list (Step S50).

On the other hand, if the file selected in Step S43 is an index pre-input file, image information does not exist in the file, and therefore it is determined whether or not the selection specified by the user on the list is for the next file (Steps S44). If the next file is selected, a further next file is selected (Step S45) and the control returns to processing in Step S42.

If the next file is not selected, it is determined whether or not the selection specified by the user on the list is for the previous file (Steps S46). If the previous file is selected, a further previous file is selected (Step S47) and the control returns to processing in Step S42.

If neither of them is selected, in other words, if the next file is not selected in Step S44 and the previous file is not selected in Step S46, the selection of the file specified by the user on the list can be considered as a selection of a specified file number, the file selection is not changed with displaying a warning for indicating that no image file exists (Step S48) and the processing is terminated.

[Fourth Embodiment]

A hardware constitution of a fourth embodiment is the same as for the second embodiment, and therefore a detailed description is omitted here.

In the fourth embodiment, a description will be made for selecting a file in the document list with the document list being linked with displaying an image in an index information editing mode. If an index pre-input file is selected during an operation in the index information editing mode, the edition of the index information must be continued with the selection being validated.

Figure 14:
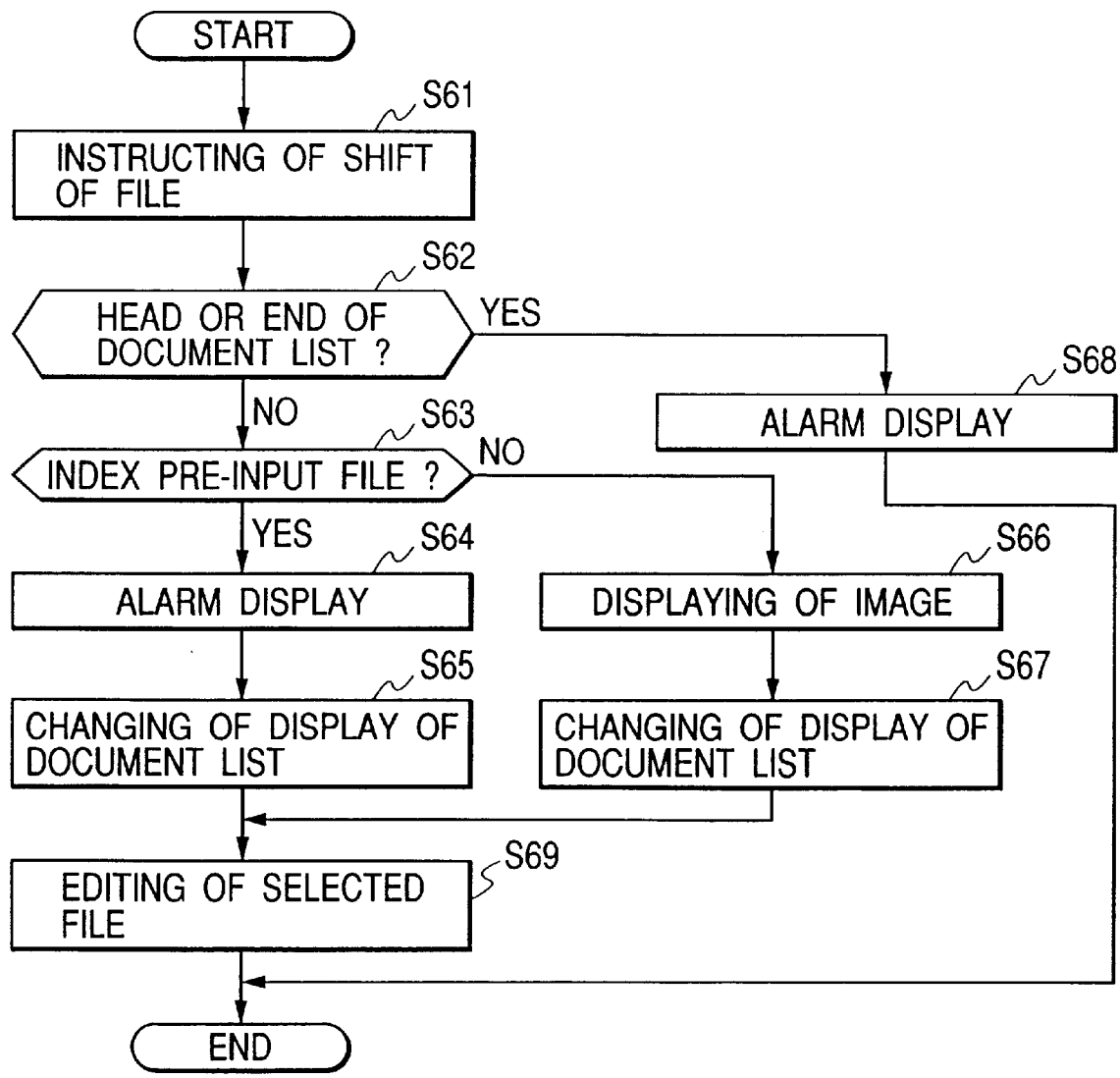
FIG. 14 is a flowchart of an image display processing procedure in a fourth embodiment.
Figure 16A:
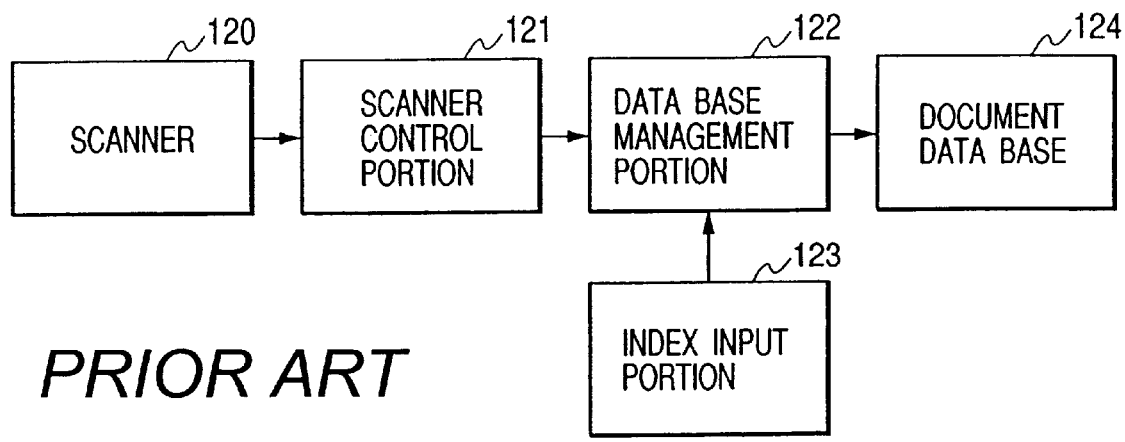
FIGS. 16A and 16B are block diagrams of a constitution of a conventional and general image filing system.
Figure 16B:
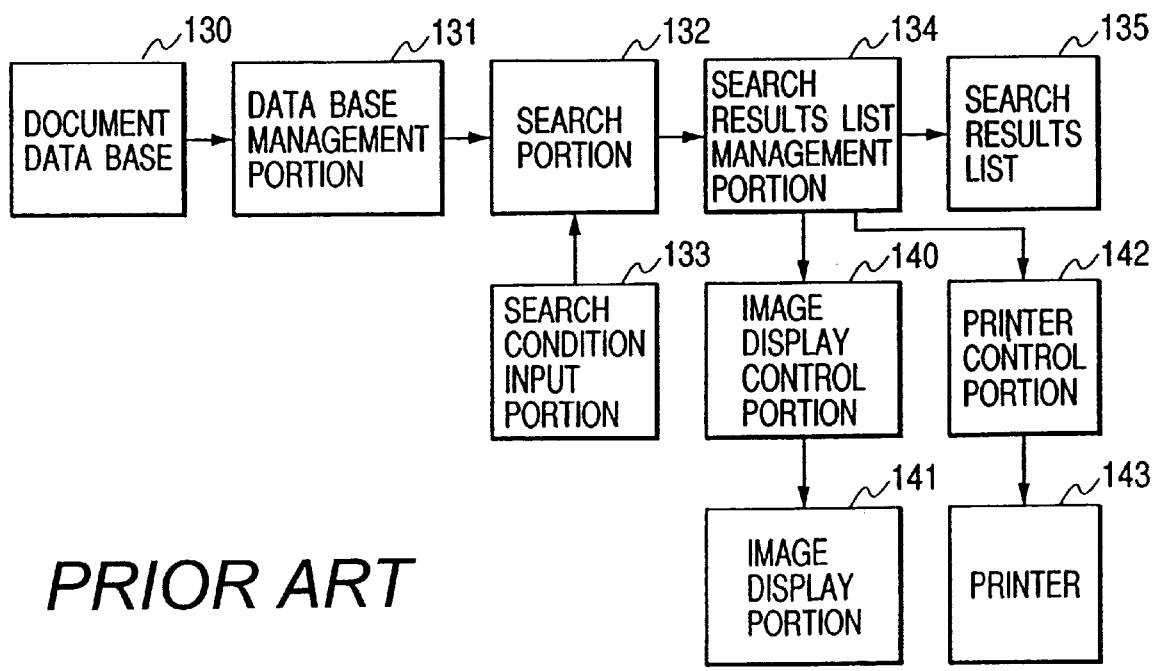

Referring to FIG. 14, there is shown a flowchart of an image display processing procedure in the fourth embodiment. A user selects a file in a document list to give an instruction on displaying an image (Step S61). First, the document list control portion 30 determines whether or not the file selected by the user is within the document list (Step S62). If it is outside the range, a warning is displayed for indicating that the user selects a file outside the range, without changing the file selection (Step S68).

It is determined whether or not the file selected by the user is an existing file or a file scanned anew, or an index pre-input file (Step S63). Unless an index pre-input file, image information exists in the file, and therefore identification information of the image information of the selected file is obtained on the basis of the index data recording portion 22 via the index data recording management portion 23.

The obtained identification information and the image display request are transmitted to the image control portion 32. The image control portion 32 obtains necessary image information from the image recording portion 20 via the image recording management portion 21 on the basis of the identification information sent from the document list control portion 30 and gives image information to the image display portion 41 via the image display control portion 40 to cause it to display the image (Step S66).

In addition, the selected file in the document list is also changed, and therefore the document list control portion 30 changes a display of the document list (Step S67) and starts an index editing operation of the selected file (Step S69).

If the selected file is an index pre-input file, image information does not exist in the file, and therefore a warning is displayed for indicating that there is no image file, without changing the file selection (Step S64). The document list control portion 30 changes a display of the document list (Step S65) and executes an editing operation of an index of the selected file (Step S69). After that, the processing is terminated.

Files treated in the present invention can include drawings such as a table, a graphic, or an arithmetic expression or photographs in addition to ordinary documents.

The present invention described in the above first to fourth embodiments can be applied to a system comprising a plurality of devices or to an apparatus comprising a single device. It is apparent that the present invention can be applied to a case in which it is implemented by supplying a program to a system or an apparatus. In this case, the system or the apparatus can enjoy the effect of the present invention by a readout from the storage medium containing a program represented by software for implementing the present invention.

In this embodiment, as set forth in the above, the program for implementing the document management system is supplied by a floppy disk. The program stored in the floppy disk is read from a disk drive 17 before the program is used (executed) and stored into a magnetic disk 15. Afterward, the program is loaded into the RAM 13 so as to be executed by the CPU 1.

Referring to FIG. 15, there is shown a diagram of a memory map of the floppy disk as a storage medium. The ROM contains document search, document record, and index input processing modules in the document management system shown in the flowchart of FIG. 3 and image display processing modules shown in flowcharts in FIGS. 12, 13, and 14.

Not only a floppy disk, but a ROM, a hard disk, an optical disk, an optical magnetic disk, a CD-ROM, a CD-R, a DVD, a magnetic tape, a nonvolatile memory card, or the like can be used as a storage medium.

According to the above embodiment, it is possible to display a search result on a single document list, to record a new file, and to index the file. Particularly, it is not necessary to provide a search mode and a record mode, by which operation steps can be reduced.

In addition, the order of inputting a document from a scanner and an index is arbitrarily selected by an operator, by which a degree of freedom in the operation is remarkably improved. This leads to an easiness of a restoring operation of an operation error, by which a superior operability is achieved.

Furthermore, a plurality of documents can be processed in a scan operation or an index input operation at a time, which contributes to a high productivity.

In indexing a new document, an index of an existing document can be referred to.

The operability is increased by integrating the search operation, the image recording operation, and an index input operation and by adapting a plurality of documents for processing at a time in this manner.

According to the above embodiment, when a list is displayed in the list display portion by the list control means, a file in which both of image information and index information of the file are recorded, a file in which only the image information is recorded, and a file in which only the index information is recorded are displayed simultaneously, by which operability of these files can be increased.

According to the above embodiment, if selecting a file having no image information in a list displayed in a list display portion by means of a list control means when the image display control means displays the image information of the file recorded in the list, a display operation of the image information is invalidated, and therefore an incorrect image information is prevented from being displayed.

According to the above embodiment, if selecting a file having no image information in a list displayed in a list display portion by means of a list control means when the image display control means displays the image information of the file recorded in the list, a warning is displayed, and therefore an operator can be prompted to select a correct document.

According to the above embodiment, if a list is linked with image information so as to display the same file, the next file in a direction of a file selection is selected to display image information and the list display is updated when selecting a file having no image information, and therefore the next image information can be displayed with associating the image information with the document list display.

According to the above embodiment, if a list is linked with image information so as to display the same file, only the list display is changed without changing the image information display when selecting a file having no image information, and therefore the document list can be reliably updated.

According to the above embodiment, the invention comprises an image printing control means for printing image information of a file and displays a warning if a file having no image information is selected in printing image information of a file registered in the list by the image printing control means, by which an operator can be prompted to select a correct document also in printing in the same manner as for an image display. In addition, display or printing of file images can be easily operated on a integrated document list.

[Fifth Embodiment]

In this embodiment, a description will be made for an operation of recording a plurality of manuscripts in the same file.

A hardware constitution of the document management system is the same as for the second embodiment, and therefore its description will be omitted here.

Figure 17A:
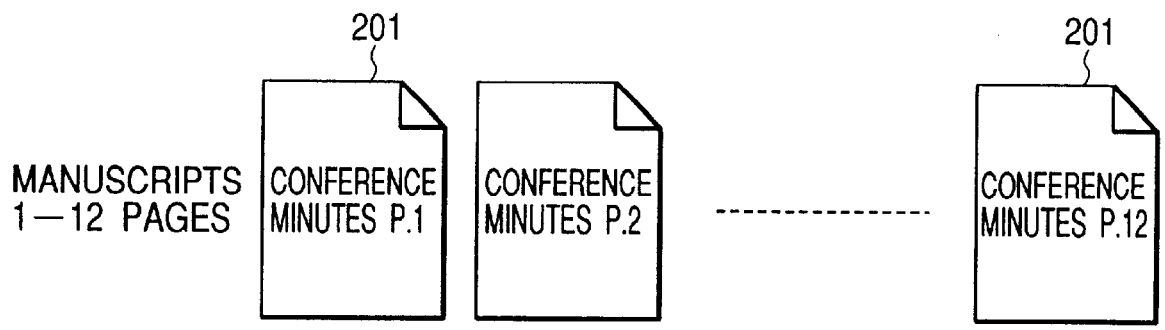
FIGS. 17A and 17B are diagrams showing a condition of recording a plurality of manuscripts to the same file.
Figure 17B:
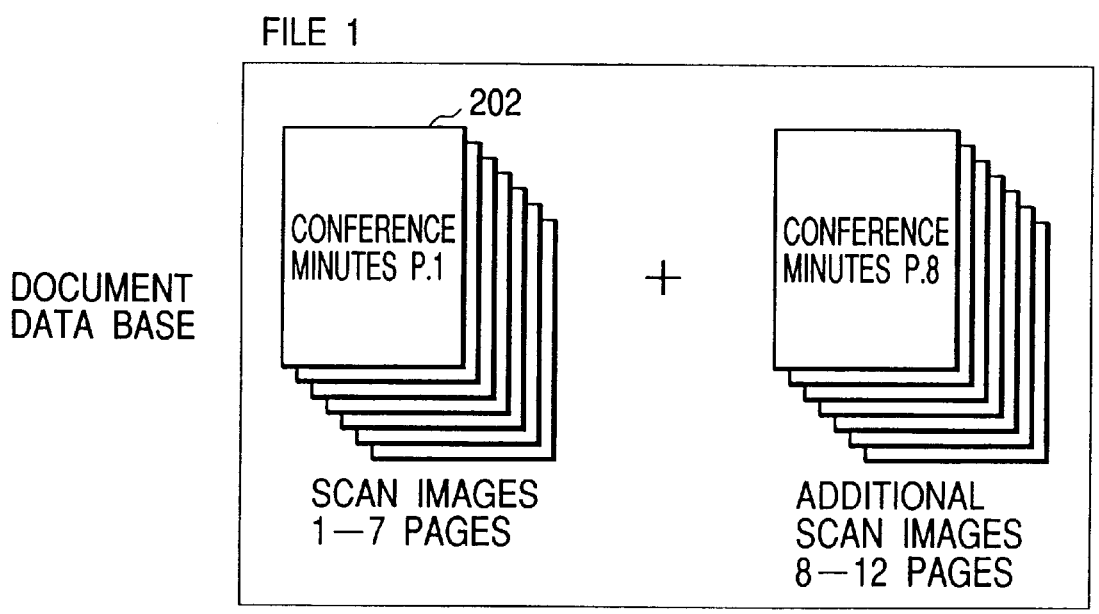

Referring to FIGS. 17A and 17B, there is shown a condition of recording a plurality of manuscripts in the same file.

It is assumed that there are manuscripts 201 of conference minutes composed of 12 pages, for example. In entering the manuscripts of 12 pages as images into a file 1 of a document data base with a scan using a scanner, the scanning is assumed to be terminated when the first 7 pages are recorded as shown in FIG. 17B. At this point, images on pages 1 to 7 are recorded in the file 1. Afterward to enter the remaining pages as the same conference minutes into the file 1, the contents of pages 8 to 12 are additionally scanned to be recorded into the file 1. These a series of processes will be described below with a reference to FIG. 18.

Figure 18:
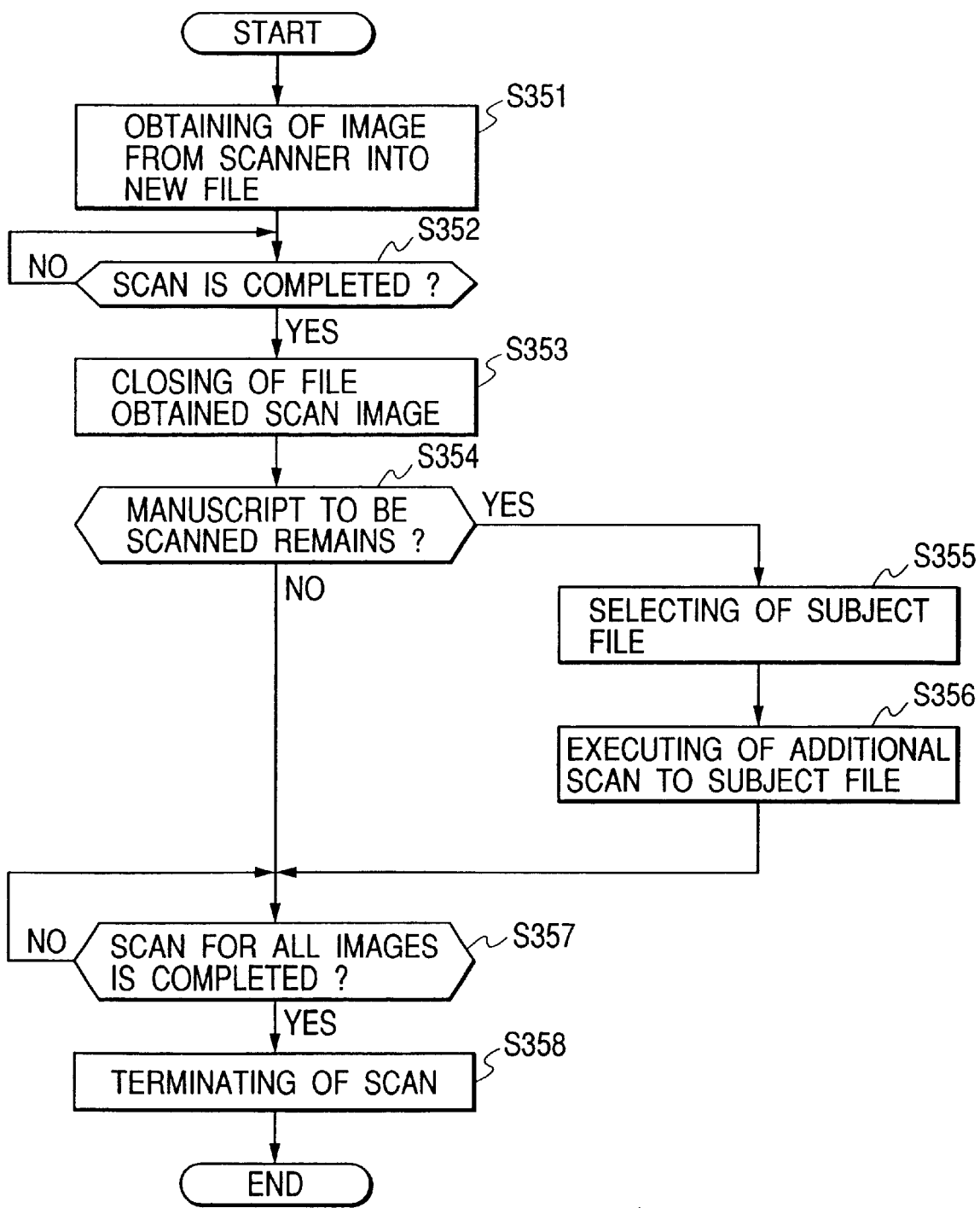
FIG. 18 is a flowchart of an additional scan processing procedure.

Referring to FIG. 18, there is shown a flowchart of a processing procedure of additional scan and record operations.

In Step S351, the system performs processing equivalent to recording images of pages 1 to 7 as a previous step of additional scan and record processing, first. In other words, images are entered from the scanner and stored in a file in the document data base. After a completion of scanning the series of the images is checked in Step S352, a file in which the scanned images are recorded is closed once in Step S353.

At this point, if there are manuscripts (pages 8 to 12) which must be further added to this file, YES is returned as a response to a judgment of whether or not a manuscript to be scanned remains in Step S354 and then the control shifts to Step S355. In Step S355, the subject file is selected, and in Step S356 the subject file is additionally scanned and remaining additional manuscript images are added to the file so as to be stored. Steps S355 and S356 are described later with reference to FIG. 12.

In Step S357, it is checked that all the manuscript images are stored and a scan operation is terminated in Step S358.

Next, to clarify how the additional scan processing in the present invention is different from the conventional additional scan processing, the conventional additional scan processing is described below with reference to FIG. 20.

Figure 20:
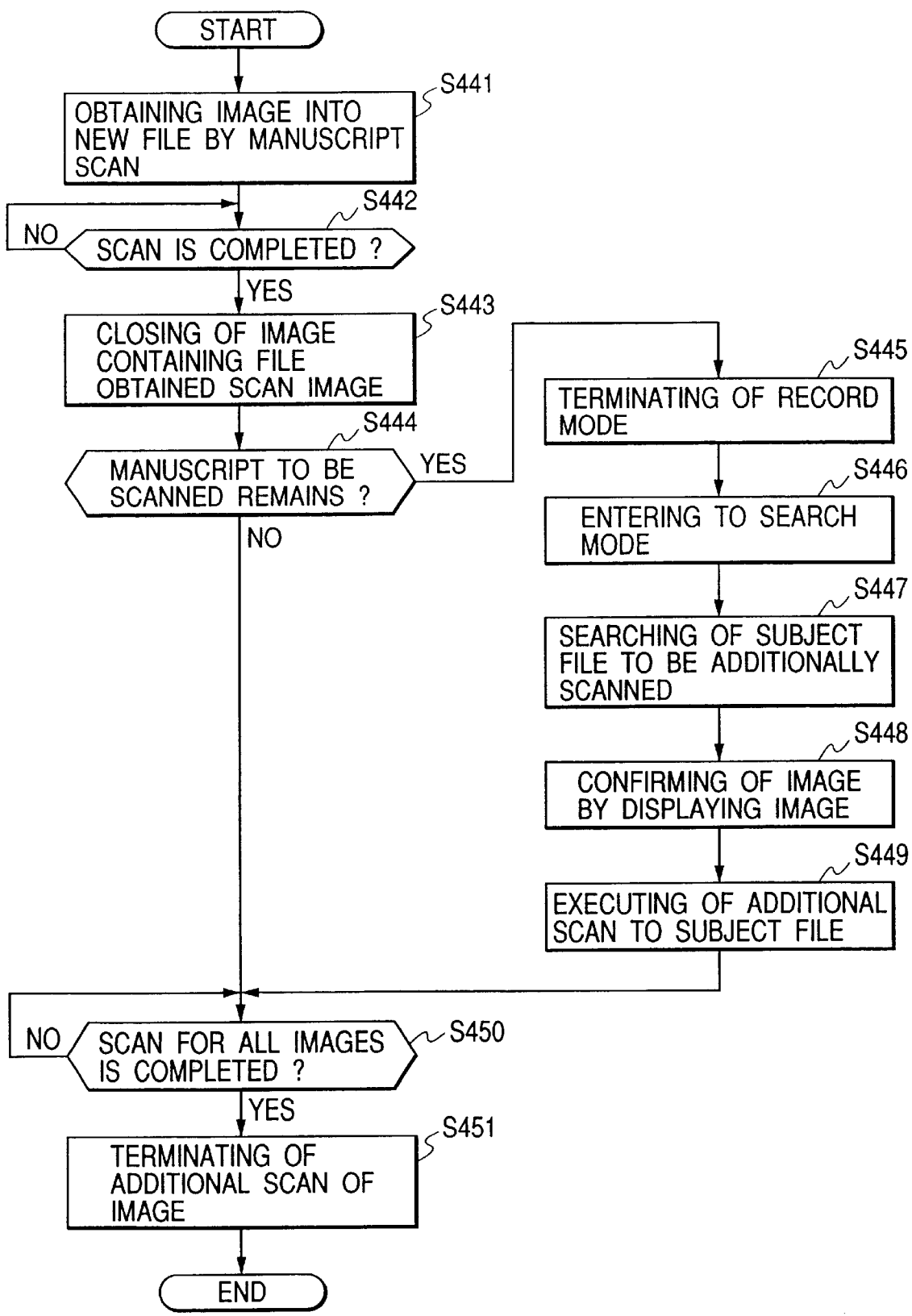
FIG. 20 is a flowchart of a conventional additional scan processing procedure.

Referring to FIG. 20, there is shown a flowchart of the conventional additional scan processing procedure.

In Steps S441 to S443, the same processing is performed as for processing of the present invention; an image is obtained from a scanner to be recorded in a file in Step S441, a completion of the scan processing is awaited in Step S442, and is closed the image containing file in which the scanned image is recorded in Step S443.

If there is a manuscript which must be scanned, YES is returned as a response to a judgment of whether or not a manuscript to be scanned remains in Step S444, the record mode is terminated in Step S445, the control enters into the search mode in Step S446, and then a search operation is performed for a file to be additionally scanned in Step S447. In Step S448, with displaying images already recorded in the file which has been found for a confirmation, a position of an image required to be added is determined. In Step S449, the additional scanned image is recorded in the subject file. After checking that all the manuscripts have been scanned (Step S450), the additional scan processing is terminated (Step S451).

In comparison with the conventional additional scan processing, the additional scan processing in the present invention does not need a procedure of shifting between the record mode and search mode and images can be checked immediately, and therefore this method is very effective for additional scan and record processing.

As types of files on the document list in the fifth embodiment, there are a new file, an index pre-input file, and an image containing file. When an image is recorded with an additional scan in any of these types of files, however, the additional scan processing must be changed according to a file type. It is described below with reference to FIG. 19.

Figure 19:
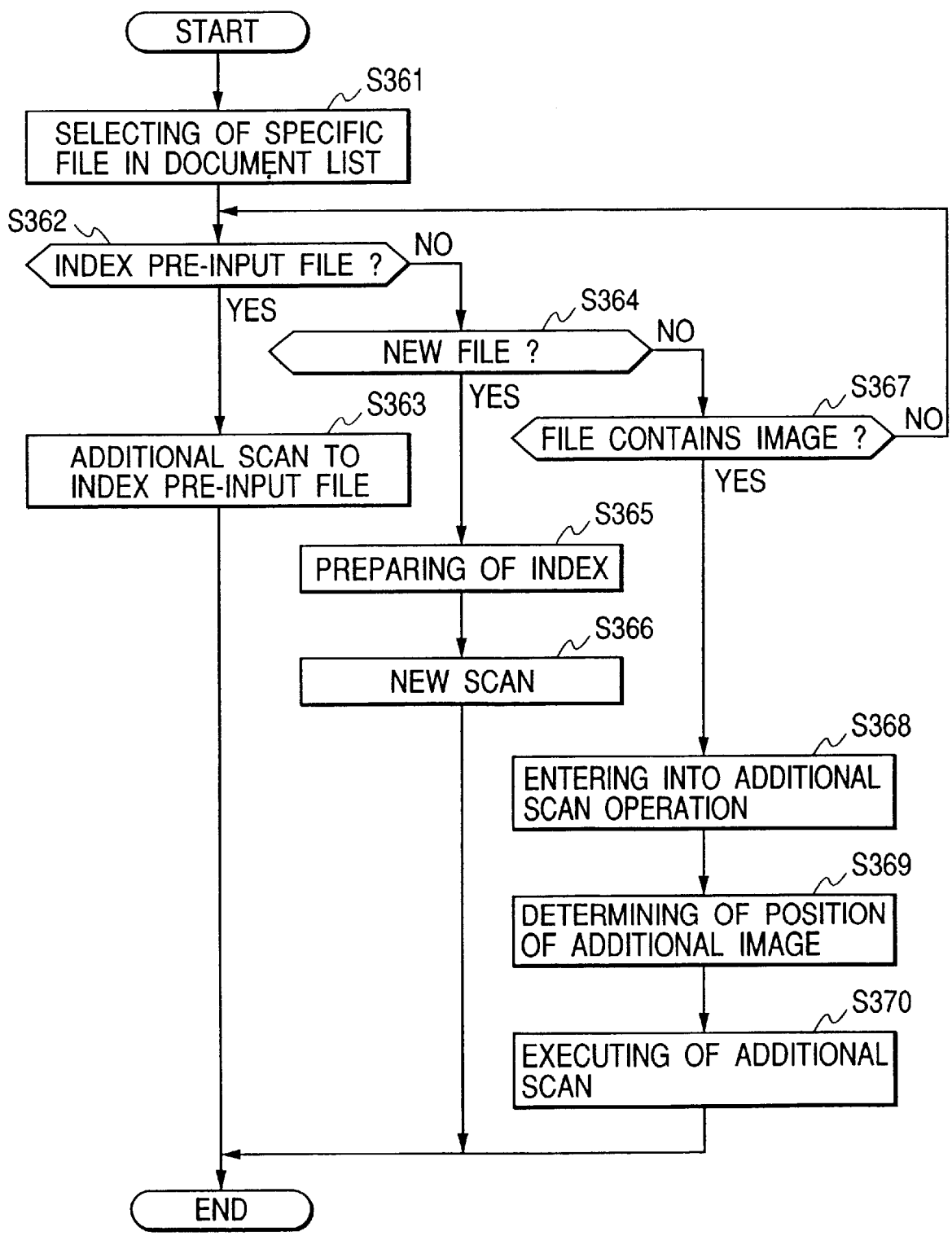
FIG. 19 is a flowchart of an additional scan processing according to various files.

Referring to FIG. 19, there is shown a flowchart of additional scan processing according to a type of various files.

In Step S361, a file in which an image is to be added is selected on a document list, first. A procedure of the subsequent additional scan processing is shown in Steps S362 and after, and first it is determined whether the selected file is an index pre-input file (YES in Step S362), a new file (YES in Step S364), or an image containing file (YES in Step S367). If it is an index pre-input file, an operation of additionally scanning the image is started for the index pre-input file in Step S363. If it is a new file, an index for the new file is created in Step S365 first, and then the image is scanned to obtain the image in Step S366. If it is a file in which an image already exists, an additional scan operation is started in Step S368, an additional position in the file of the image to be added is determined in Step S369 and then the image is additionally scanned in Step S370.

As set forth hereinabove, in a document management system which can perform record or search operations, an additional scan processing is performed using a document list in which a file record and a search result are integrated, by which a complicated operation need not be performed and an additional record operation can be easily continued also for a file in which a record operation is interrupted in the midst of the operation.

[Sixth Embodiment]

A hardware constitution of a sixth embodiment is the same as for the second embodiment, and therefore a detailed description is omitted here.

Figure 21A:
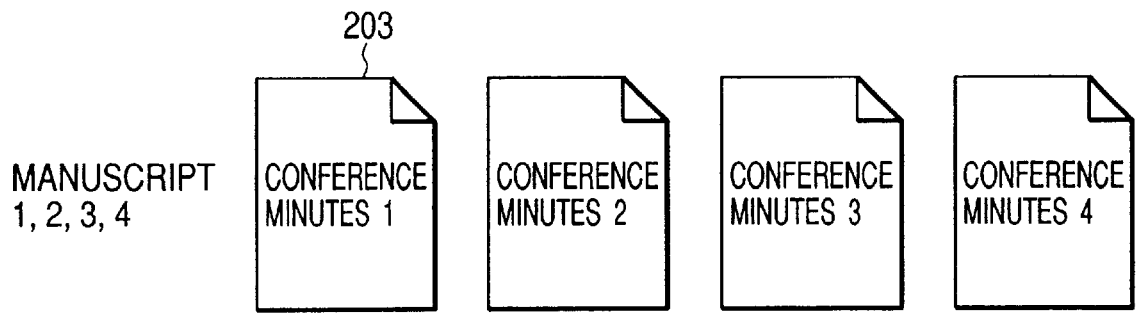
FIGS. 21A and 21B are diagrams showing a form of an image to be recorded in a file treated in a sixth embodiment.
Figure 21B:
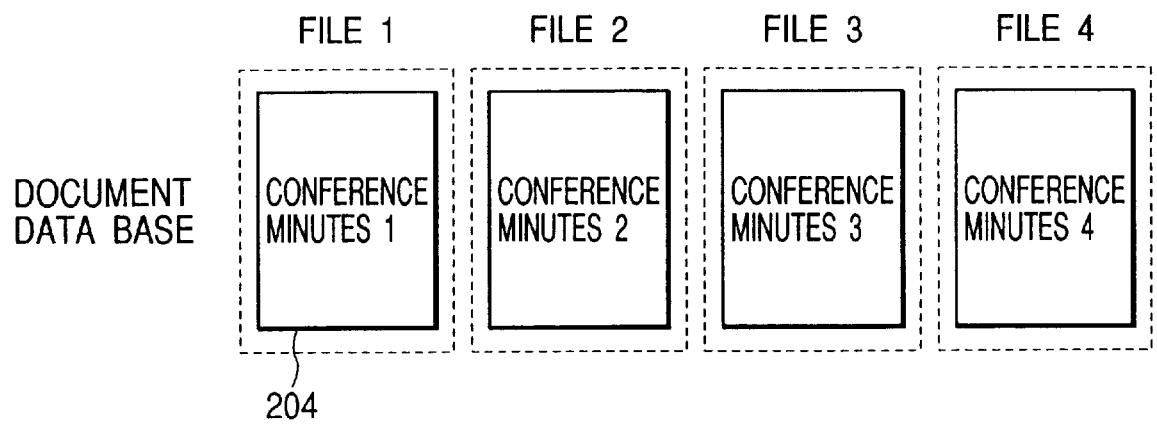

Referring to FIGS. 21A and 21B, there is shown a form of images to be recorded in files to be treated in the sixth embodiment. As shown in FIG. 14A, it is assumed that there are manuscripts 203 of conference minutes 1, 2, 3, and 4 composed of four pages. These four pages of manuscripts are to be scanned by a scanner so as to be entered in a document data base as image files. In the sixth embodiment, the manuscripts are stored in a document data base in a method in which an image on a single page is stored as a single file as shown in FIG. 14B. In other words, a single page is stored as a single file such that a conference minute 1 is stored as a file 1 in a document data base, a conference minute 2 is as a file 2 in the document data base, or the like. This storing method is hereinafter referred to as "one page per file".

Figure 22:
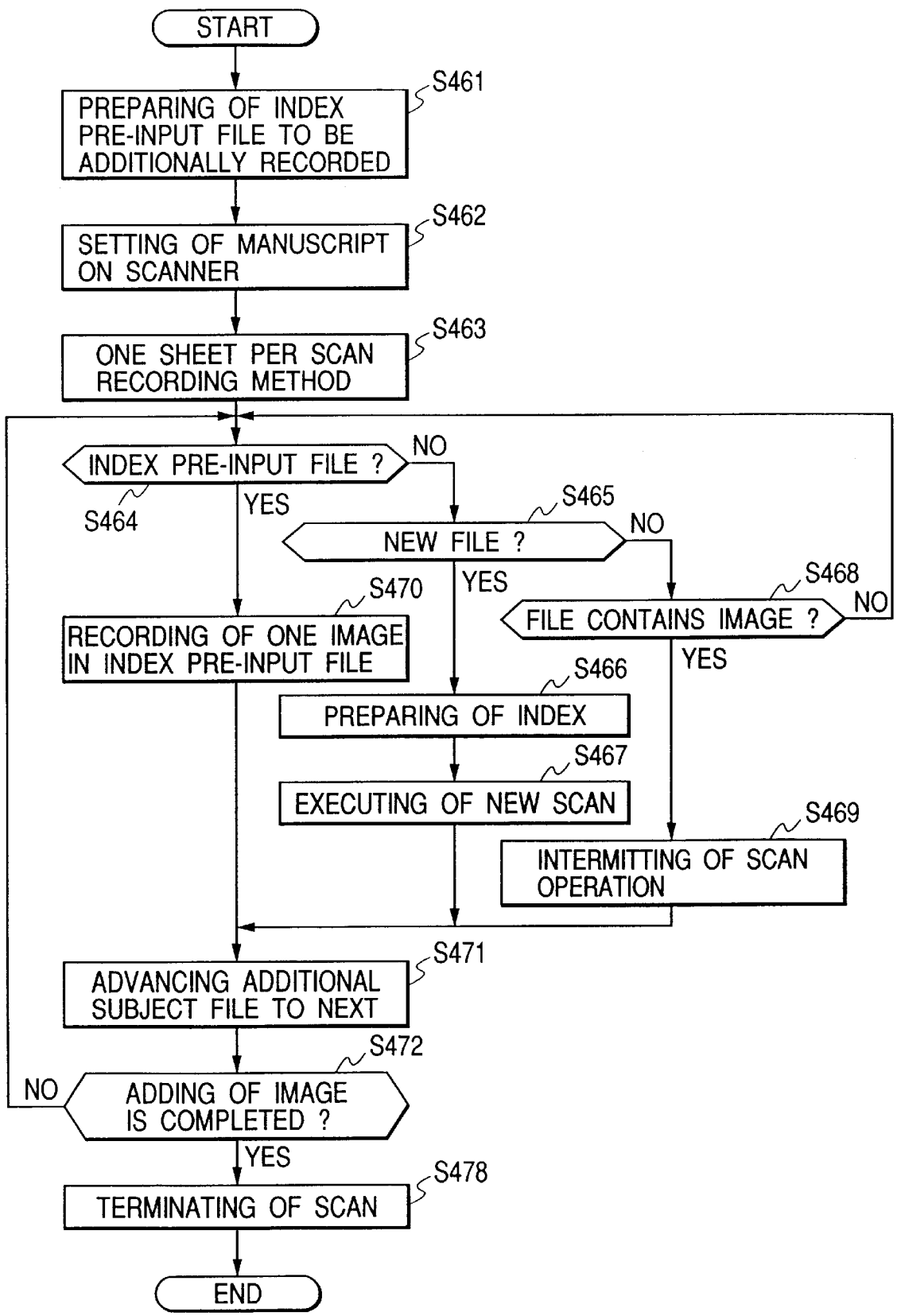
FIG. 22 is a flowchart of a processing procedure for finding out an index pre-input file or the like in the document list for executing an additional scan (for "one page per file") in the sixth embodiment.

Referring to FIG. 22, there is shown a flowchart of a processing procedure for performing a search for an index pre-input file on a document list and an additional scan (for "one page per file") in the sixth embodiment.

In the sixth embodiment, for a document list containing index pre-input files, new files, and image containing files, is used a scan (for "one page per file") recording method in which respective files are sequentially added with a single image forming a single file. Since files are added in the one page per file storing method, and therefore it is necessary to prevent a new image from being added to an image containing file.

First, in Step S461 in FIG. 22, a plurality of index pre-input files are prepared as destinations into which additionally scanned images are recorded. After the index pre-input files are prepared, manuscripts to be scanned are set on the scanner in Step S462 and a scan is started in the one page per file recording method in Step S463.

To determine whether or not a selected file can be used for recording a scanned image while respective files are selected sequentially on the document list, the type of the selected file is determined on the document list in Steps S464, S465, and S468. It is determined whether the subject file is an index pre-input file in Step S464; if it is an index pre-input file, a scanned image is additionally recorded in Step S470. If the selected file is a new file in the determination in Step S465, an index has not been prepared yet and therefore an index is prepared in Step S466 and the same processing as a new scan is performed to prepare a file in the one image per file method. If the selected file is an image containing file in the determination in Step S468, an image cannot be added, and therefore the scan operation is intermitted so as not to record an image into the image containing file in Step S469.

A selected file is advanced to the next file on the document list in Step S471 and it is checked that the addition of the images is completed in Step S472. If it is completed, the additional scan is terminated in Step S473.

[Seventh Embodiment]

A hardware constitution of a seventh embodiment is the same as for the second embodiment.

Therefore, the hardware constitution of the second embodiment is appropriated to a description of the seventh embodiment.

Figure 23:
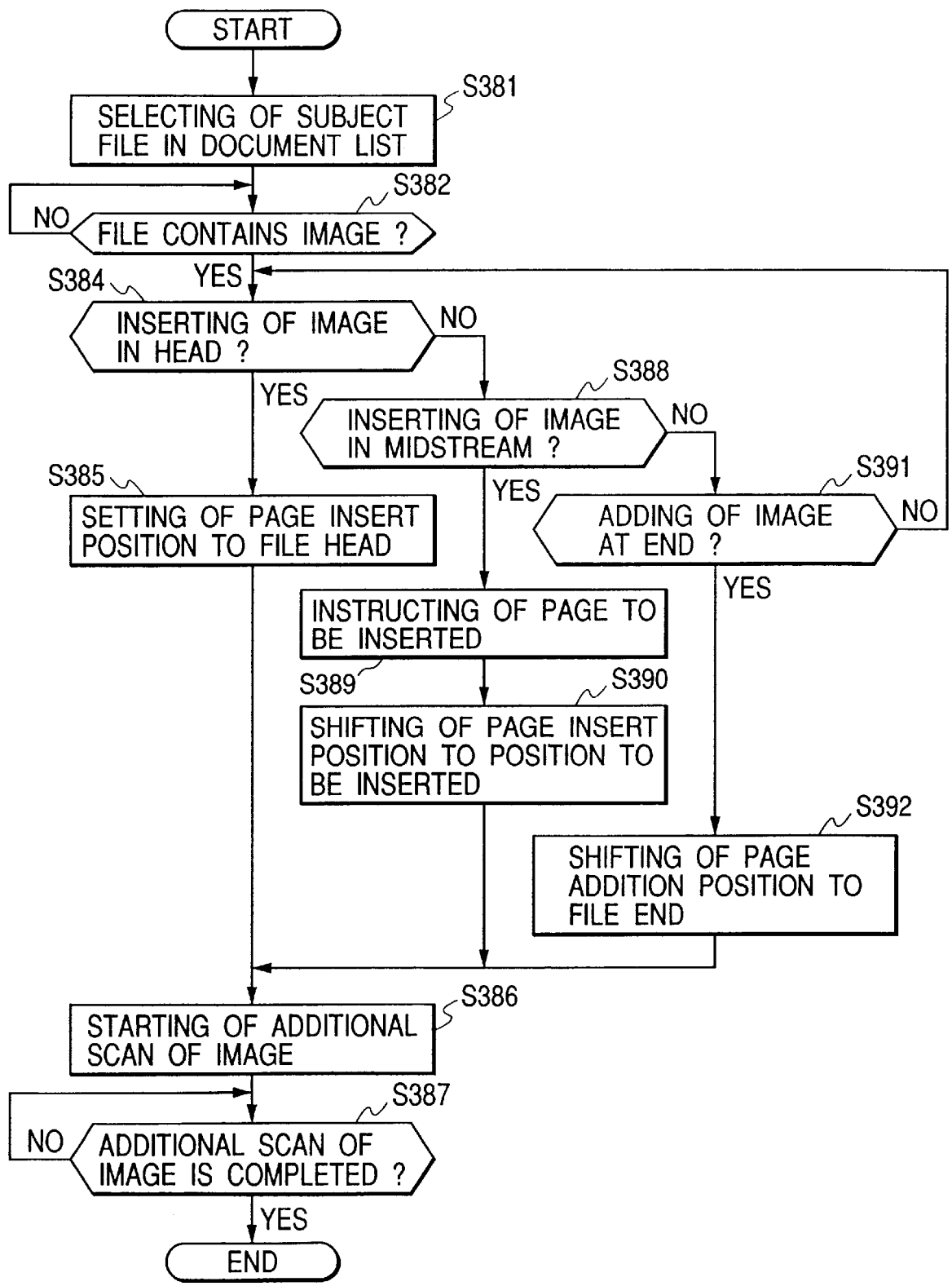
FIG. 23 is a flowchart of a processing procedure for additionally recording an image to an image containing file in the document list in a seventh embodiment.

Referring to FIG. 23, there is shown a flowchart of processing procedure for additionally recording an image into an image containing file in the document list in the seventh embodiment. This procedure depends upon a position in the image containing file where an image should be additionally recorded.

A file is selected on the document list in Step S381 in FIG. 23 and it is determined whether or not the selected file is an image containing file in Step S382. If it is an image containing file, a position in the file where a scanned image is additionally recorded in Steps S384, S388, and S391. After checking an instruction of inserting the scanned image on a head page of the file in Step S384, an insert position of the scanned image is set to the head of the file in Step S385 and a scan of the image is started in Step S386. After checking an instruction of inserting the image on a middle page in the file in Step S388, the insert page is specified in Step S389, an insert position is shifted to the specified page in Step S390, and a scan operation is started in Step S386. After checking an instruction of adding the scanned image on the last page of the file in Step S391, a position where a page is to be added is shifted to the end of the file in Step S392 and an image scan operation is started in Step S386.

In Step S387, it is checked that the additional scan of the image is completed.

[Eighth Embodiment]

A hardware constitution of an eighth embodiment is the same as for the second embodiment.

Therefore, the constitution of the second embodiment is appropriated to a description of the eighth embodiment.

Figure 24:
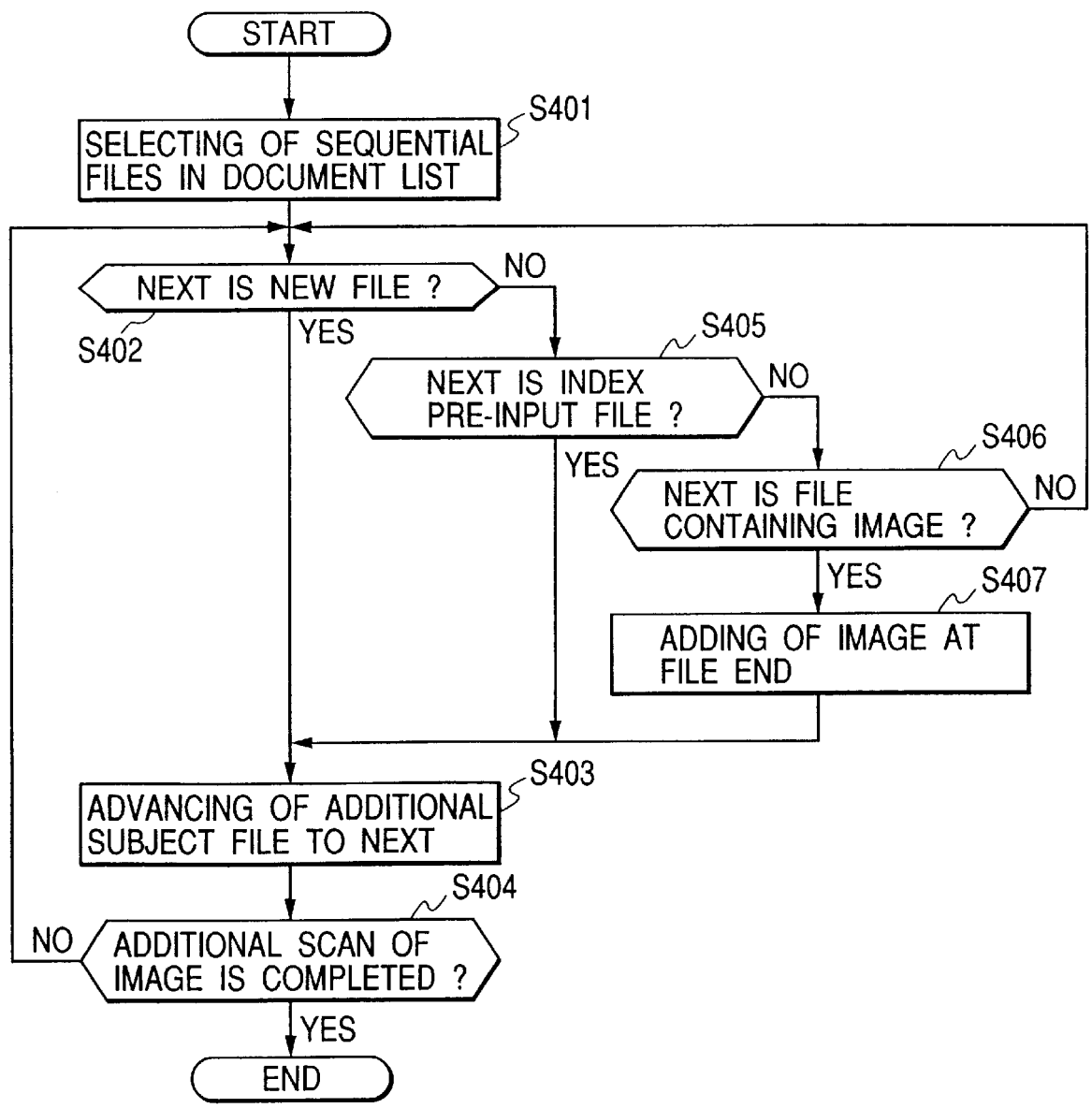
FIG. 24 is a flowchart of a processing procedure for finding out a plurality of sequential image containing files in the document list for additionally recording images into the file.

Referring to FIG. 24, there is shown a flowchart of a processing procedure for finding out a plurality of continuous image containing files on a document list and additionally recording images into corresponding files in the eighth embodiment.

In Step S401, a plurality of continuous image containing files are selected on a document list. In Steps S402, S405, and S406, the types of files are determined. If the next file is determined to be a new scan file in Step S402 or to be an index pre-input file in Step S405, an additional scan is not performed. If the next file is determined to be an image containing file in Step S406, an image is additionally scanned at the end position of the image containing file in Step S407.

A selected file is advanced to the next file in the document list in Step S403 and a completion of all the image additional scanning is awaited in Step S404.

[Ninth Embodiment]

A hardware constitution of a ninth embodiment is the same as for the second embodiment.

Figure 25:
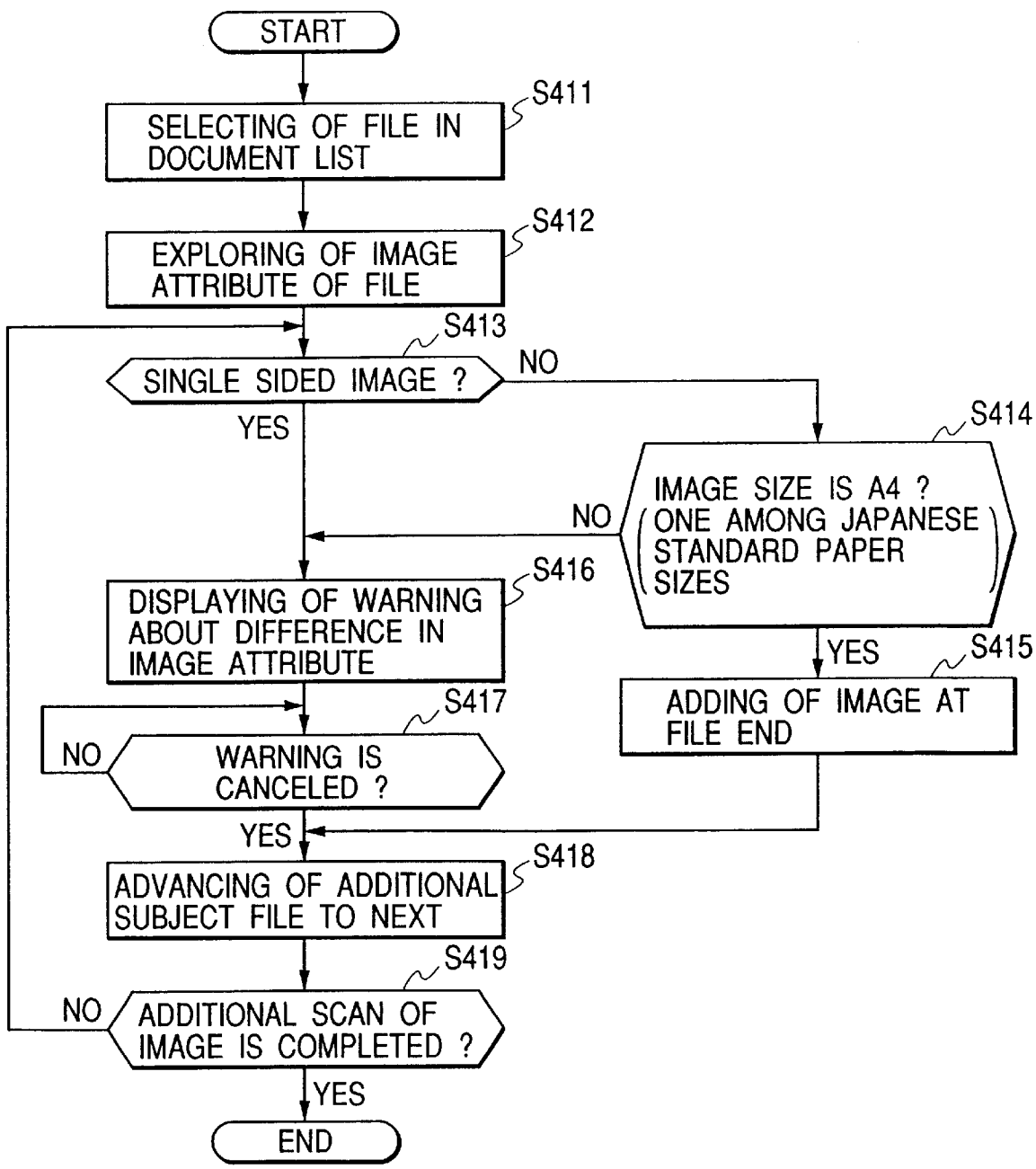
FIG. 25 is a flowchart of a processing procedure for additionally scanning only images having matched file image attributes in a ninth embodiment.

Therefore, the constitution of the second embodiment is appropriated to a description of the ninth embodiment. Referring to FIG. 25, there is shown a flowchart of a processing procedure for additionally scanning only images having matched file image attributes in the ninth embodiment. This section describes a procedure of an additional scan for processing in which each file recorded in a document list contains attributes of the images in the file and only images having matched image attributes are recorded in the file.

In this flowchart, the image attributes are determined for a file in the document list to add an image or to display a warning that the image attributes are different. There are prepared files having an attribute of a single sided image or a double sided image and an attribute of an A4 image size (Japanese standard size of a form) or any of other sizes, so as to select an image to be added according to the attributes.

In FIG. 25, it is assumed that an image having attributes of a double sided image and an A4 size is additionally scanned and recorded in a file.

A file is selected out of the document list in Step S411 and image attributes of the selected file are checked in Step S412. If the file has an attribute of a single sided image (YES in Step S413), a warning is displayed for indicating that the file attributes are different in Step S416 and the control is placed in the wait state until the warning is canceled by an operator a wait state (Step S417) without scanning the image. If the selected file has an image attribute of a double sided image, the image size is determined in Step S414. If it is the A4 size, the selected file is additionally scanned for registration in Step S415. Unless the selected file has the A4 size image attribute, a warning is displayed in Step S416 and the image is not additionally scanned.

After a completion of the operation for the selected file, a file to be selected is advanced to the next file in Step 418 and a completion of an additional scan of all the images is awaited in Step S419.

[Tenth Embodiment]

A hardware constitution of a tenth embodiment is the same as for the second embodiment.

Therefore, the constitution of the second embodiment is appropriated to a description of the tenth embodiment.

Figure 26:
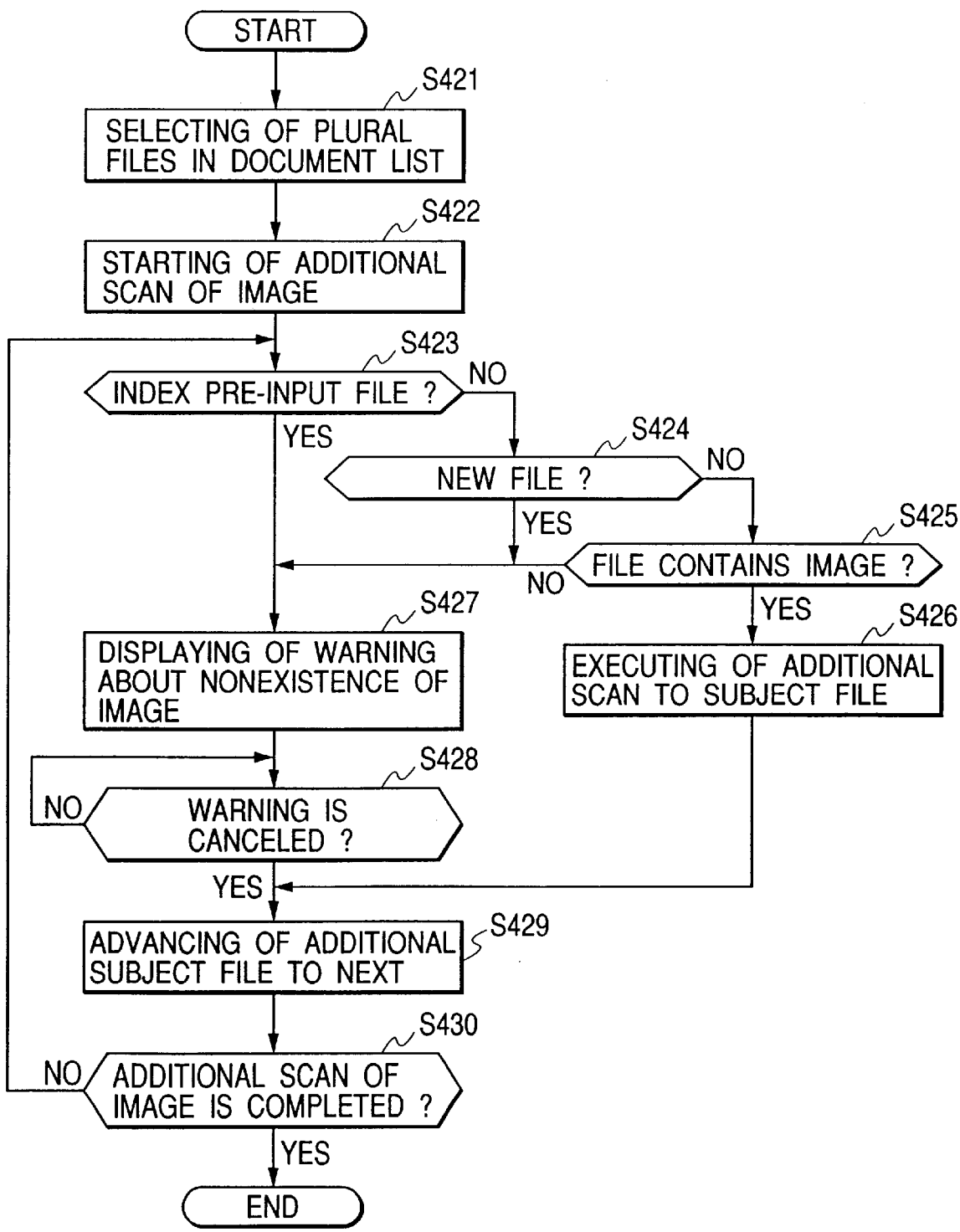
FIG. 26 is a flowchart of a processing procedure for additionally scan and recording an image into a file containing image among a plurality of files in the document list and a processing procedure for giving a warning for a file containing no image.

Referring to FIG. 26, there is shown a flowchart of a processing procedure for additionally scanning and recording an image into an image containing file among a plurality of files in the document list and a processing procedure for issuing a warning for a file containing no image.

A plurality of arbitrary files in the document list are previously selected in Step S421 and an additional scan of an image is started in Step S422. In Steps S423, S424, and S425, the type of each of the selected files is determined. If it is determined to be an index pre-input file in Step S423, a warning about nonexistence of an image is displayed in Step S427 and the control is put in a wait state until this warning is canceled by an operator (Step S428). If it is determined to be a new scan file in Step S424, the same warning as for the index pre-input file is displayed. If it is determined to be an image containing file in Step S425, it is a file for additional scan and record processing, and therefore additional scan and record processing is performed for the file in Step S426.

In Step S429, a file whose type is to be determined is advanced to the next in the selected files in Step S429. After checking a completion of the additional scan processing for all the selected files in Step S430, this procedure is terminated.

In these embodiments described above, when additionally scanning a plurality of files in a document list containing document records and search results integrally in an image filing system in which images can be recorded and searched for, an additional scan processing is executed while determining types and image attributes or the like of the files in the document list. According to it, an additional scan processing can be efficiently performed for a plurality of files. In addition, a warning is displayed at an encounter with a file which cannot be additionally scanned, by which an operation error can be prevented.

While an additional scan processing is performed for all of the images to be recorded in the files in the embodiments, the present invention can be applied to importing or moving, insertion, replacement, copying, or other processing of images if the images are recorded in a normal document management system.

Furthermore, the present invention can be applied to a system comprising a plurality of devices or to an apparatus comprising a single device.

Naturally, with supplying a storage medium containing a program code of software for realizing functions of the above embodiments to a system or an apparatus, a computer (or CPU or MPU) of the system or the apparatus can read out the program code stored in the storage medium for an execution so as to implement the present invention.

In this case, the program code itself read out from the storage medium performs the functions of the above embodiments and the storage medium containing the program code forms the present invention.

As storage mediums for supplying the program code, there are a floppy disk, a hard disk, an optical disk, an optical magnetic disk, a CD-ROM, a CD-R, a magnetic tape, a nonvolatile memory card, a ROM or the like, for example.

Naturally, the present invention is not limited to the functions of the above embodiments realized by an execution of the program code read out by the computer, but also includes functions of the above embodiments realized by an actual processing partially or entirely performed by an operating system running in the computer on the basis of an instruction of the program code.

Furthermore, the present invention also includes functions of the above embodiments realized by an actual processing partially or entirely performed by the CPU in a feature expansion board or a function expansion unit on the basis of an instruction of a program code read out from the storage medium after the program code read out from the storage medium is written into a memory in the function expansion board inserted in the computer or in the function expansion unit connected to the computer.

As described in details above, according to these embodiments, an additional scan and record processing is performed using a file list containing file records and search results integrally in a file management system in which record and search operations can be executed. Accordingly an additional record can be easily continued without a complicated operation also for a file whose record operation is intermitted. In other words, a record operation and a search operation are integrated, by which the operability is improved.

In addition, when an additional scan is performed for a plurality of files in a file list containing file records and search results integrally in a file management system in which record and search operations can be performed, the additional scan processing is performed while determining types, image attributes, or the like of the files. Accordingly the additional scan processing can be efficiently performed for the plurality of files. In addition, a warning is displayed at an encounter with a file for which an additional scan processing cannot be performed, so that an operation error can be prevented.

Furthermore, a new scan file, an index pre-input file, and an image containing file having a recorded image need not be discriminated from each other in an additional record operation, by which a continuous record operation can be easily performed at a time without a need for a particular operation such as switching a processing mode at an additional record for a plurality of files in the file list containing these various types of files.

What is claimed is:

1. A file management system, comprising:

memory for memorizing a database which includes a plurality of record files, each record file being related with index information and image information;

image input means for inputting the image information;

index input means for inputting the index information;

display control means for controlling to display a list which includes at least one record file of the database, each record file in the list indicating whether it has related image information, index information, or both;

determining means for determining whether an user instructs an input of new image information before an input of index information related to the new image information or the user instructs an input of index information related to new image information before an input of the new image information; and control means for controlling to create a new record file in the list, the new record file being related with the new image information inputted by said image input means, if said determining means determines that the user instructs the input of new image information before the input of index information related to the new image information, and controlling to create a new record file in the list, the new record file being related with the index information inputted by said index input means, if said determining means determines that the user instructs the input of index information related to new image information before the input of the new image information, and controlling to record the created new record file into the database.

2. A file management system according to claim 1, further comprising search means for searching the list for a record file on the basis of said index information, wherein said display control means controls to display a list including only the record file of the search result with said search means.

3. A file management system according to claim 1, wherein said display control means controls to display together a record file related with both of the image information and the index information, a record file related with only the image information, and a record file related with only the index information.

4. A file management system according to claim 1, wherein said display control means controls to display discriminatingly a record file related with both of the image information and the index information, a record file related with only the image information, and a record file related with only the index information.

5. A file management system according to claim 1, further comprising selection means for selecting a desired record file out of said list.

6. A file management system according to claim 5, wherein said determining means determines whether the user instructs that a new image information is related to the selected record file, and wherein said control means for controlling to relate the new image information inputted by said image input means to the record file selected by said selection means.

7. A file management system according to claim 6, wherein said control means controls to determine a recording position of the input new image information in the selected record file if the selected record file has already recorded image information, and controls to record the input new image information at the determined recording position.

8. A file management system according to claim 5, wherein said determining means determines whether the user instructs that a new index information is related to the selected record file, and wherein said control means for controlling to relate the new index information inputted by said index input means to the record file selected by said selection means.

9. A file management system according to claim 5, wherein said display control means controls to display the image information being related to the selected record file, and wherein a warning is given if no image information is related to the selected file.

10. A file management system according to claim 5, wherein said display control means controls to display the image information being related to the selected record file, and wherein, if no image information is related to the selected file, said selection means selects following record file.

11. A file management system according to claim 5, wherein said display control means controls to display the image information being related to the selected record file, and wherein, if no image information is related to the selected file, only a display of said list is updated.

12. A file management system according to claim 5, further comprising printing control means for controlling to print the image information being related to the selected record file, wherein said printing control means gives a warning if no image information is related to the selected record file.

13. A file management system according to claim 5, wherein, if the user instructs that the input new image information is additionally related to the selected record file, the record file containing image information is selected out of said list and the input new image information is additionally related to the selected record file.

14. A file management system according to claim 1, wherein the database includes a type of the record file being related to only single image information.

15. A file management system according to claim 1, wherein the record file contains attribute information of the image information, the system further comprising selection means for selecting a record file out of the list, the attribute of the selected record file matching the attribute of the input new image information, and wherein said control means for controlling to relate the new image information inputted by said image input means to the record file selected by said selection means.

16. A file management method for controlling a file management system having memory for memorizing a database which includes a plurality of record files, each record file being related with index information and image information, the method comprising:

an image input process for inputting the image information;

an index input process for inputting the index information;

a display control process for controlling to display a list which includes at least one record file of the database, each record file in the list indicating whether it has related image information, index information, or both;

a determining process fox determining whether an user instructs an input of new image information before an input of index information related to the new image information or the user instructs an input of index information related to new image information before an input of the new image information; and a control process for controlling to create a new record file in the list, the new record file being related with the new image information inputted by said image input process, if said determining process determines that the user instructs the input of new image information before the input of index information related to the new image information, and controlling to create a new record file in the list, the new record file being related with the index information inputted by said index input process, if said determining process determines that the user instructs the input of index information related to new image information before the input of the new image information, and controlling to record the created new record file into the database.

17. A file management method according to claim 16, further comprising a search process for searching the list for a record file on the basis of said index information, wherein said display control process controls to display a list including only the record file of the search result with said search process.

18. A file management method according to claim 16, wherein said display control process controls to display together a record file related with both of the image information and the index information, a record file related with only the image information, and a record file related with only the index information.

19. A file management method according to claim 16, wherein said display control process controls to display discriminatingly a record file related with both of the image information and the index information, a record file related with only the image information, and a record file related with only the index information.

20. A file management method according to claim 16, further comprising a selection process for selecting a desired record file out of said list.

21. A file management method according to claim 20, wherein said determining process determines whether the user instructs that a new image information is related to the selected record file, and wherein said control process is for controlling to relate the new image information inputted by said image input process to the record file selected by said selection process.

22. A file management method according to claim 21, wherein said control process controls to determine a recording position of the input new image information in the selected record file if the selected record file has already recorded image information, and controls to record the input new image information at the determined recording position.

23. A file management method according to claim 20, wherein said determining process determines whether the user instructs that a new index information is related to the selected record file, and wherein said control process is for controlling to relate the new index information inputted by said index input process to the record file selected by said selection process.

24. A file management method according to claim 20, wherein said display control process controls to display the image information being related to the selected record file, and wherein a warning is given if no image information is related to the selected file.

25. A file management method according to claim 20, wherein said display control process controls to display the image information being related to the selected record file, and wherein, if no image information is related to the selected file, said selection process selects following record file.

26. A file management method according to claim 20, wherein said display control process controls to display the image information being related to the selected record file, and wherein, if no image information is related to the selected file, only a display of said list is updated.

27. A file management method according to claim 20, further comprising a printing control process for controlling to print the image information being related to the selected record file, wherein said printing control process gives a warning if no image information is related to the selected record file.

28. A file management method according to claim 20, wherein, if the user instructs that the input new image information is additionally related to the selected record file, the record file containing image information is selected out of said list and the input new image information is additionally related to the selected record file.

29. A file management method according to claim 16, wherein the database includes a type of the record file being related to only single image information.

30. A file management method according to claim 16, wherein the record file contains attribute information of the image information, the system further comprising a selection process for selecting a record file out of the list, the attribute of the selected record file matching the attribute of the input new image information, and wherein said control process is for controlling to relate the new image information inputted by said image input process to the record file selected by said selection process.

31. A file management medium storing a computer-executable program for controlling a file management system having memory for memorizing a database which includes a plurality of record files, each record file being related with index information and image information, the program comprising:

an image input process for inputting the image information;

an index input process for inputting the index information;

a display control process for controlling to display a list which includes at least one record file of the database, each record file in the list indicating whether it has related image information, index information, or both;

a determining process fox detaining whether an user instructs an input of new image information before an input of index information related to the new image information or the user instructs an input of index information related to new image information before an input of the new image information; and a control process for controlling to create a new record file in the list, the new record file being related with the new image information inputted by said image input process, if said determining process determines that the user instructs the input of new image information before the input of index information related to the new image information, and controlling to create a new record file in the list, the new record file being related with the index information inputted by said index input process, if said determining process determines that the user instructs the input of index information related to new image information before the input of the new image information, and controlling to record the created new record file into the database.

32. A file management medium according to claim 31, further comprising a search process for searching the list for a record file on the basis of said index information, wherein said display control process controls to display a list including only the record file of the search result with said search process.

33. A file management medium according to claim 31, wherein said display control process controls to display together a record file related with both of the image information and the index information, a record file related with only the image information, and a record file related with only the index information.

34. A file management medium according to claim 31, wherein said display control process controls to display discruninatingly a record file related with both of the image information and the index information, a record file related with only the image information, and a record file related with only the index information.

35. A file management medium according to claim 31, further comprising selection process for selecting a desired record file out of said list.

36. A file management medium according to claim 35, wherein said determining process determines whether the user instructs that a new image information is related to the selected record file, and wherein said control process is for controlling to relate the new image information inputted by said image input process to the record file selected by said selection process.

37. A file management medium according to claim 36, wherein said control process controls to determine a recording position of the input new image information in the selected record file if the selected record file has already recorded image information, and controls to record the input new image information at the determined recording position.

38. A file management medium according to claim 35, wherein said determining process determines whether the user instructs that a new index information is related to the selected record file, and wherein said control process is for controlling to relate the new index information inputted by said index input process to the record file selected by said selection process.

39. A file management medium according to claim 35, wherein said display control process controls to display the image information being related to the selected record file, and wherein a warning is given if no image information is related to the selected file.

40. A file management medium according to claim 35, wherein said display control process controls to display the image information being related to the selected record file, and wherein, if no image information is related to the selected file, said selection process selects following record file.

41. A file management medium according to claim 35, wherein said display control process controls to display the image information being related to the selected record file, and wherein, if no image information is related to the selected file, only a display of said list is updated.

42. A file management medium according to claim 35, further comprising a printing control process for controlling to print the image information being related to the selected record file, wherein said printing control process gives a warning if no image information is related to the selected record file.

43. A file management medium according to claim 35, wherein, if the user instructs that the input new image information is additionally related to the selected record file, the record file containing image information is selected out of said list and the input new image information is additionally related to the selected record file.

44. A file management medium according to claim 31 wherein the database includes a type of the record file being related to only single image information.

45. A file management medium according to claim 31 wherein the record file contains attribute information of the image information, the system further comprising a selection process for selecting a record file out of the list, the attribute of the selected record file matching, the attribute of the input new image information, and wherein said control process is for controlling to relate the new image information inputted by said image input process to the record file selected by said selection process.

* * * * *

UNITED STATES PATENT AND TRADEMARK OFFICE
CERTIFICATE OF CORRECTION

PATENT NO.    : 6,594,650 B2
DATED         : July 15, 2003
INVENTOR(S)   : Kamon Hasuo et al.

It is certified that error appears in the above-identified patent and that said Letters Patent is hereby corrected as shown below:

Column 1,
Line 21, "a management." should read -- management. --.

Column 9,
Line 37, "are not" should read -- is not --.

Column 24,
Line 30, "an user" should read -- a user --.

Column 26,
Line 9, "fox determining whether an" should read -- for determining whether a --.

Column 27,
Line 60, "fox detaining whether an" should read -- for determining whether a --.

Column 28,
Line 28, "discruninatingly" should read -- discriminatingly --.

Column 30,
Lines 1 and 4, "claim 31" should read -- claim 31, --.

Signed and Sealed this

Eleventh Day of November, 2003

JAMES E. ROGAN
*Director of the United States Patent and Trademark Office*